US009285906B2

(12) United States Patent
Higashi et al.

(10) Patent No.: US 9,285,906 B2
(45) Date of Patent: Mar. 15, 2016

(54) INFORMATION PROCESSING APPARATUS, INFORMATION DISPLAY SYSTEM AND INFORMATION DISPLAY METHOD

(71) Applicants: Haruomi Higashi, Kanagawa (JP); Akira Miyazaki, Kanagawa (JP)

(72) Inventors: Haruomi Higashi, Kanagawa (JP); Akira Miyazaki, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 300 days.

(21) Appl. No.: 13/903,153

(22) Filed: May 28, 2013

(65) Prior Publication Data

US 2013/0321312 A1 Dec. 5, 2013

(30) Foreign Application Priority Data

May 29, 2012 (JP) ................................. 2012-122487

(51) Int. Cl.
*G06F 3/041* (2006.01)
*G06F 3/01* (2006.01)
*G09G 3/00* (2006.01)

(52) U.S. Cl.
CPC ............... *G06F 3/041* (2013.01); *G06F 3/011* (2013.01); *G06F 2203/04806* (2013.01); *G09G 3/001* (2013.01); *G09G 2320/0606* (2013.01); *G09G 2340/045* (2013.01)

(58) Field of Classification Search
CPC .......... G06F 3/011; G06F 2203/04806; G09G 3/001; G09G 2320/0606; G09G 2340/045
See application file for complete search history.

(56) References Cited

U.S. PATENT DOCUMENTS

| 8,610,787 | B2 * | 12/2013 | Namba | ..................... G02B 7/28 348/142 |
| 8,947,349 | B1 * | 2/2015 | Hart | ....................... G09G 3/002 345/156 |
| 2003/0062675 | A1 * | 4/2003 | Noro | .................... A63F 3/00643 273/237 |
| 2003/0095155 | A1 * | 5/2003 | Johnson | ................ G06F 1/1626 715/864 |
| 2003/0234799 | A1 * | 12/2003 | Lee | ........................ G06F 3/1407 345/660 |
| 2004/0160386 | A1 * | 8/2004 | Michelitsch | ............. G09G 5/00 345/10 |
| 2004/0175020 | A1 * | 9/2004 | Bradski | ................. G06F 1/3203 382/103 |
| 2005/0059488 | A1 * | 3/2005 | Larsen | ..................... A63F 13/10 463/36 |
| 2005/0229200 | A1 * | 10/2005 | Kirkland | ............... G06F 3/0481 725/12 |
| 2005/0253807 | A1 * | 11/2005 | Hohmann | ............... G06F 3/043 345/156 |
| 2005/0270368 | A1 * | 12/2005 | Hashimoto | ............ H04N 7/181 348/61 |
| 2007/0126884 | A1 * | 6/2007 | Xu | ...................... G06K 9/00221 348/220.1 |
| 2008/0069664 | A1 | 3/2008 | Nagata et al. | |
| 2008/0229212 | A1 | 9/2008 | Miyazaki | |
| 2009/0064002 | A1 | 3/2009 | Katsumata et al. | |
| 2009/0141895 | A1 * | 6/2009 | Anderson | ............... G06F 21/84 380/252 |
| 2009/0284594 | A1 * | 11/2009 | Mitsuhashi | ............ G09G 5/003 348/135 |

(Continued)

FOREIGN PATENT DOCUMENTS

JP 2000-181619 6/2000
JP 2005-327262 11/2005

*Primary Examiner* — Kathy Wang-Hurst
*Assistant Examiner* — Peijie Shen
(74) *Attorney, Agent, or Firm* — Oblon, McClelland, Maier & Neustadt, L.L.P.

(57) ABSTRACT

An information processing apparatus include a position detecting unit that detects positions of a plurality of users existing in a detection target area; a calculating unit that calculates a plurality of feature quantities representing a relation between the positions of the users detected by the position detecting unit and a projection plane on which a projection image is projected; and a determining unit that determines display control processing for the projection image depending on the feature quantities calculated by the calculating unit.

20 Claims, 19 Drawing Sheets

(56) References Cited

U.S. PATENT DOCUMENTS

| | | | | |
|---|---|---|---|---|
| 2009/0313584 A1* | 12/2009 | Kerr | G06F 3/012 | 715/849 |
| 2010/0079508 A1* | 4/2010 | Hodge | G06F 3/013 | 345/697 |
| 2010/0124363 A1* | 5/2010 | Ek | G06F 21/84 | 382/118 |
| 2010/0161409 A1* | 6/2010 | Ryu | G06Q 30/02 | 705/14.43 |
| 2010/0266162 A1* | 10/2010 | Singh | G06F 3/011 | 382/103 |
| 2011/0067098 A1* | 3/2011 | Nelson | G06F 21/32 | 726/21 |
| 2011/0119640 A1* | 5/2011 | Berkes | G06F 3/011 | 715/863 |
| 2011/0164188 A1* | 7/2011 | Karaoguz | G06F 3/011 | 348/734 |
| 2011/0216060 A1* | 9/2011 | Weising | G09G 5/08 | 345/419 |
| 2012/0019447 A1* | 1/2012 | Hanes | G06F 1/3203 | 345/168 |
| 2012/0050273 A1* | 3/2012 | Yoo | G06F 3/012 | 345/419 |
| 2012/0105438 A1* | 5/2012 | Huang | A63F 13/10 | 345/419 |
| 2012/0194517 A1* | 8/2012 | Izadi | G06T 17/00 | 345/420 |
| 2012/0249741 A1* | 10/2012 | Maciocci | G06F 3/011 | 348/46 |
| 2012/0287031 A1* | 11/2012 | Valko | G09G 5/00 | 345/156 |
| 2013/0021240 A1* | 1/2013 | Coulon | G06F 21/6245 | 345/156 |
| 2013/0057573 A1* | 3/2013 | Chakravarthula | G06F 3/005 | 345/619 |
| 2014/0313230 A1* | 10/2014 | Suggs | G06T 3/00 | 345/648 |

* cited by examiner

FIG.3
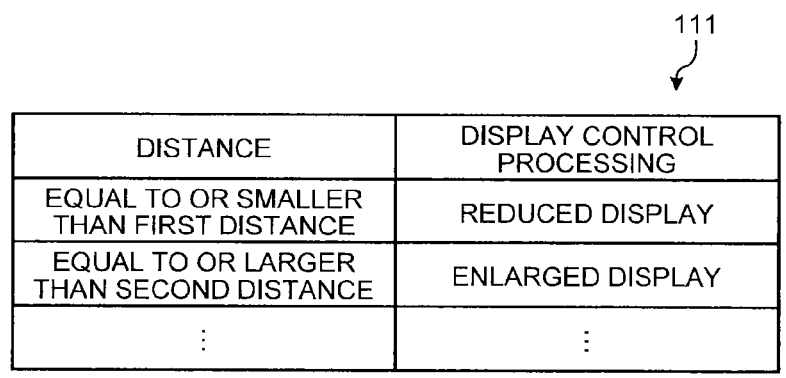
FIG.4
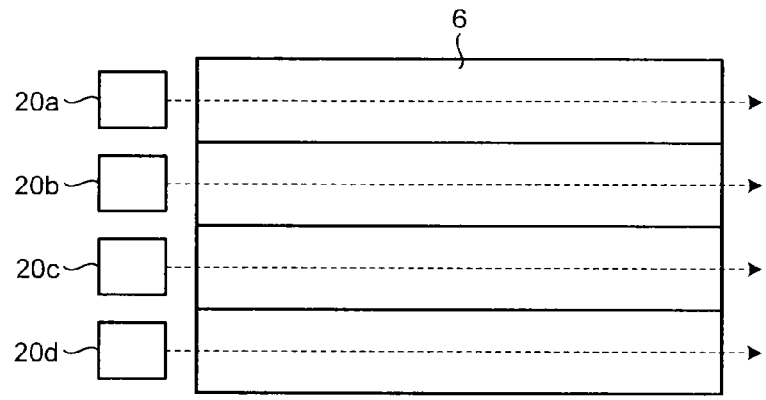
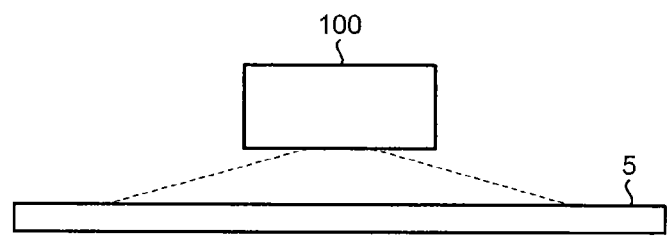

| USER POSITION | DISPLAY CONTROL PROCESSING |
|---|---|
| SEAT AT LEFT END | KEYSTONE CORRECTION DISPLAY IN WHICH TRAPEZOID IS WIDER AT RIGHT SIDE THAN LEFT |
| SEAT AT RIGHT END | KEYSTONE CORRECTION DISPLAY IN WHICH TRAPEZOID IS WIDER AT LEFT SIDE THAN RIGHT |
| ⋮ | ⋮ |

| POSITION OF CONCENTRATED AREA | DISPLAY CONTROL PROCESSING |
|---|---|
| FRONT SIDE | REDUCED DISPLAY |
| BACK SIDE | ENLARGED DISPLAY |
| LEFT SIDE | KEYSTONE CORRECTION DISPLAY IN WHICH TRAPEZOID IS WIDER AT RIGHT SIDE THAN LEFT |
| RIGHT SIDE | KEYSTONE CORRECTION DISPLAY IN WHICH TRAPEZOID IS WIDER AT LEFT SIDE THAN RIGHT |
| ⋮ | ⋮ |

| DISTANCE | DISPLAY CONTROL PROCESSING |
|---|---|
| EQUAL TO OR SMALLER THAN FIRST DISTANCE | ENLARGED DISPLAY |
| EQUAL TO OR LARGER THAN SECOND DISTANCE | REDUCED DISPLAY |
| ⋮ | ⋮ |

| PRESENCE/ABSENCE OF USER IN SPECIFIED AREA | DISPLAY CONTROL PROCESSING |
|---|---|
| PRESENT | DISPLAY |
| ABSENT | BLIND-DISPLAY |
| ⋮ | ⋮ |

INFORMATION PROCESSING APPARATUS, INFORMATION DISPLAY SYSTEM AND INFORMATION DISPLAY METHOD

CROSS-REFERENCE TO RELATED APPLICATIONS

The present application claims priority to and incorporates by reference the entire contents of Japanese Patent Application No. 2012-122487 filed in Japan on May 29, 2012.

BACKGROUND OF THE INVENTION

1. Field of the Invention

The present invention relates to an information processing apparatus, an information display system, and an information display method.

2. Description of the Related Art

Conventionally, there are various techniques for controlling a device to be controlled depending on a gesture that is a given action of a user. Such techniques make it possible to control a device to be controlled without touching directly the device to be controlled or using a controller, etc. for controlling the device to be controlled. For example, Japanese Patent Application Laid-open No. 2005-327262 discloses a technique for changing display information on a touch panel display installed in a public place depending on a distance between the touch panel display and a user approaching the touch panel display.

With the conventional techniques, however, it is difficult to perform display control preferable for a plurality of users. Japanese Patent Application Laid-open No. 2005-327262 describes that the display information on the touch panel display is controlled based on the position of a user detected in a detection field arranged in front of the touch panel display with an arbitrary distance, but does not describe the control performed when a plurality of users are detected in the detection field. As a result, with the techniques disclosed in Japanese Patent Application Laid-open No. 2005-327262, it is difficult to perform display control preferable for a plurality of users.

There is a need for an information processing apparatus, an information display system, and an information display method that are capable of display control preferable for a plurality of users.

SUMMARY OF THE INVENTION

According to an embodiment, there is provided an information processing apparatus that include a position detecting unit that detects positions of a plurality of users existing in a detection target area; a calculating unit that calculates a plurality of feature quantities representing a relation between the positions of the users detected by the position detecting unit and a projection plane on which a projection image is projected; and a determining unit that determines display control processing for the projection image depending on the feature quantities calculated by the calculating unit.

According to another embodiment, there is provided an information display system that includes a detection device and an information processing apparatus. The information display system includes a detection information detecting unit that detects detection information including information for detecting positions of a plurality of users existing in a detection target area; a position detecting unit that detects positions of the users from the detection information; a calculating unit that calculates a plurality of feature quantities representing a relation between the detected positions of the users and a projection plane on which a projection image is projected; a determining unit that determines display control processing for the projection image depending on the calculated feature quantities; and a display control unit that controls display of the projection image on the projection plane in accordance with the determined display control processing.

According to still another embodiment, there is provided an information display method that includes detecting detection information including information for detecting positions of a plurality of users existing in a detection target area; detecting positions of the users from the detection information; calculating a plurality of feature quantities representing a relation between the detected positions of the users and a projection plane on which a projection image is projected; determining display control processing for the projection image depending on the calculated feature quantities; and controlling display of the projection image on the projection plane in accordance with the determined display control processing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of information stored in a display control processing storing unit in the first embodiment;

FIG. 4 is a conceptual diagram illustrating information display processing in the first embodiment;

DETAILED DESCRIPTION OF THE PREFERRED EMBODIMENTS

Embodiments of an information processing apparatus, an information display system, and an information display method according to the invention will be described below with reference to the accompanying drawings.

First Embodiment

System Configuration

Figure 1:
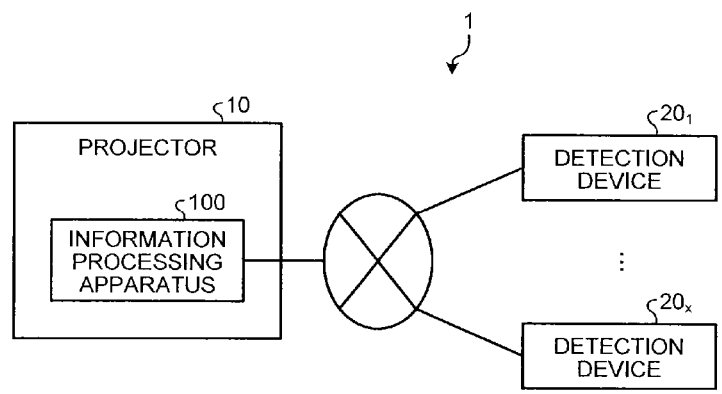
FIG. 1 is a diagram illustrating a configuration example of an information display system.

The configuration of the information display system is described with reference to FIG. 1. FIG. 1 is a diagram illustrating a configuration example of the information display system. As illustrated in FIG. 1, in an information display system 1, a projector 30 and detection devices $20_1$ to $20_x$ (X is a natural number) are connected to a network. The projector 10 includes an information processing apparatus 100. The number of detection devices used may not be two or more, and may be one.

The projector 10 is a projection device projecting a projection image on a projection plane such as a screen. A projection image projected with the projector 10 is generated by the information processing apparatus 100. The detection devices $20_1$ to $20_x$ detect the detection information of users existing in a detection target area. For example, the detection devices $20_1$ to $20_x$ are image capturing devices such as a camera, or devices outputting directional beams. The detection devices $20_1$ to $20_x$ are also used to detect the detection information of the users existing in the detection target area so as to detect the positions of the users in the detection target area, distances between the users and the screen, and the like.

The information processing apparatus 100 receives the detection information detected by the detection devices $20_1$ to $20_x$ through a network. Then, the information processing apparatus 100 detects the positions of the users in the detection target area based on the detection information, and calculates a plurality of feature quantities representing the relation between the detected positions of the respective users and the screen. Each of the feature quantities is the distance between the screen and the position of each user, for example. Subsequently, the information processing apparatus 100 determines display control processing for a projection image to be projected on the screen depending on the calculated feature quantities, and controls display of the projection image on the screen in accordance with the determined display control processing. The display control processing is processing for enlarging or reducing a projection image, for example. With the display control performed by the information processing apparatus 100, the projector 10 projects the projection image on the screen. In the following, the projector 10 and the information processing apparatus 100 may be referred to as the "information processing apparatus 100" as one housing.

Figure 2:
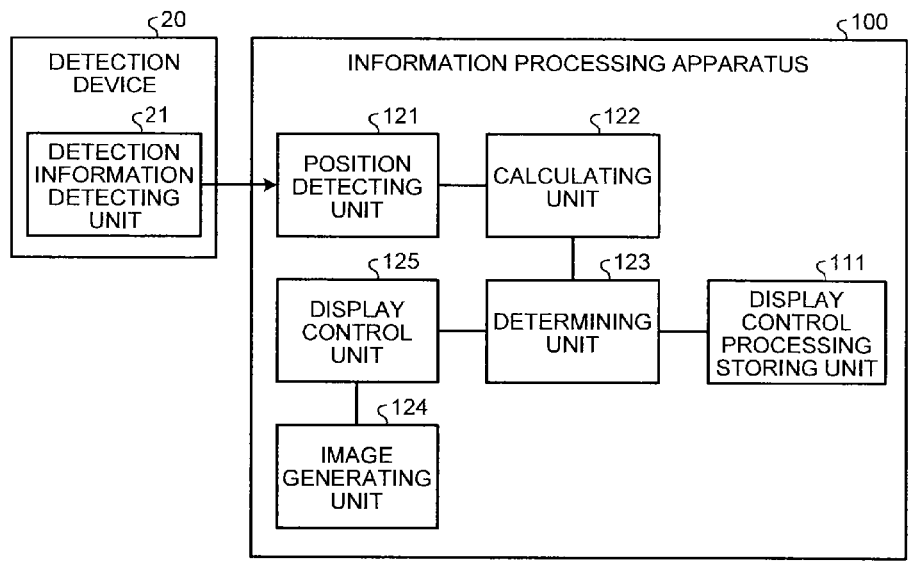
FIG. 2 is a functional block diagram illustrating a configuration example of an information processing apparatus according to a first embodiment of the present invention.

Configuration of an Information Processing Apparatus According to the First Embodiment Next, the configuration of the information processing apparatus 100 according to a first embodiment of the present invention is described with reference to FIG. 2. FIG. 2 is a functional diagram illustrating a configuration example of the information processing apparatus 100 in the first embodiment. In FIG. 2, the detection devices $20_1$ to $20_x$ are illustrated as the "detection device 20".

As illustrated in FIG. 2, the information processing apparatus 100 includes a display control processing storing unit 111, a position detecting unit 121, a calculating unit 122, a determining unit 123, an image generating unit 124, and a display control unit 12b. The detection device 20 is an image capturing device such as a camera, or a device outputting directional beams, and includes a detection information detecting unit 21.

The detection information detecting unit 21, as a camera, transmits an image obtained by capturing the detection target area to the information processing apparatus 100, as detection information. Alternatively, the detection information detecting unit 21, as a device to output directional beams, transmits information for detecting the positions of the users in the detection target area, based on the distances to the users that are obtained through the reflection of output beam, to the information processing apparatus 100, as detection information. That is, the detection information includes information for detecting the positions of the users existing in the detection target area, as an example. In the following, a camera is exemplified as an example of the detection information detecting unit 21.

The position detecting unit 121 receives the detection information transmitted by the detection information detecting unit 21, and detects, based on the received detection information, the positions of the users in the detection target area. To be more specific, the position detecting unit 121 receives the detection information as the image captured with the camera, and detects, based on the received image, the positions of users in the detection target area. In the detection of the user position by the position detecting unit 121, a plurality of users may be detected. For the detection of the user position by the position detecting unit 121, an arbitrary method may be employed, such as a method in which a region specifying a person such as a face is detected from a given frame so as to detect, based on the size of the region or a distance between the region and a region of another user, the positions of the users in the detection target area. Furthermore, the positions of the users may be detected based on information obtained through the output of directional beams in addition to the image captured with the camera.

The calculating unit 122 calculates respective distances between the positions of a plurality of users that are detected by the position detecting unit 121 and the screen, as feature quantities. To be more specific, the calculating unit 122 calculates the distances between the users and the screen based on the positions of the users that are detected by the position detecting unit 121 and predefined screen position information. In the case where the screen position information is not defined in advance, a position of the screen may be determined temporarily depending on the arrangement direction of the screen relative to the detection target area so as to calculate the distances between the screen whose position is determined temporarily and the users.

The determining unit 123 determines display control processing for a projection image to be projected on the screen depending on the distances between the users and the screen that are calculated by the calculating unit 122. To be more specific, the determining unit 123 determines whether all of the distances between the users and the screen that are calculated by the calculating unit 122 are equal to or smaller than a first distance. If all of the distances between the users and the screen are equal to or smaller than the first distance, the determining unit 123 determines display control processing for reducing the projection image to be projected on the screen. Moreover, the determining unit 123 determines whether all of the distances between the users and the screen that are calculated by the calculating unit 122 are equal to or larger than a second distance. If all of the distances between the users and the screen are equal to or larger than the second distance, the determining unit 123 determines display control processing for enlarging the projection image to be projected on the screen. Here, the relation between the first distance and the second distance is "first distance<second distance". The distance is determined by the determining unit 123 with respect to all users in the detecting target area, and the display processing mentioned above is determined when the above condition is fulfilled regarding all of the users. When the above condition is not fulfilled such as a case where a user exists between the first distance and the second distance, the determining unit 123 does not determine display control processing for enlarging or reducing the projection image. The display control processing in accordance with the distance equal to or smaller than the first distance or the distance equal to or larger than the second distance is performed using information stored in the display control processing storing unit 111.

FIG. 3 is a diagram illustrating an example of information stored in the display control processing storing unit 111 in the first embodiment. As illustrated in FIG. 3, the display control processing storing unit 111 stores therein the "distance" representing a distance between each user in the detection target area and the screen, and the "display control processing" representing display control processing for a projection image to be projected on the screen in an associated manner. For example, the display control processing storing unit 111 stores therein the distance "equal to or smaller than the first distance" and the display control processing "reduced display" in an associated manner. In addition, the display control processing storing unit 111 stores therein the distance "equal to or larger than the second distance" and the display control processing "enlarged display" in an associated manner. That is, the determining unit 123 refers to the display control processing storing unit 111, and determines display control processing for reduced display when the distance is equal to or smaller than the first distance, and determines display control processing for enlarged display when the distance is equal to or larger than the second distance.

The image generating unit 124 generates a projection image to be projected on the screen. To be more specific, the image generating unit 124 generates the projection image to be projected on the screen depending on the given operation of a personal computer (PC) or the gesture of the user. The image generating unit 124 may acquire a projection image to be projected on the screen from a given PC, etc.

The display control unit 125 controls display of the projection image generated by the image generating unit 124 in accordance with the display control processing determined by the determining unit 123. To be more specific, the display control unit 125 reduces or enlarges the projection image generated by the image generating unit 124 in accordance with the display control processing for reduced display or enlarged display that is determined by the determining unit 123, and outputs the reduced or enlarged image to the projector 10. When the display control processing for reduced display or enlarged display is not determined by the determining unit 123, the display control unit 125 outputs the projection image generated by the image generating unit 124 to the projector 10 without reducing or enlarging it. Then, the projector 10 projects the projection image output by the display control unit 125 on the screen. As the reduction ratio or the enlargement ratio of the projection image, there may be used a value preliminarily set depending on the size of the screen.

Concept of Information Display Processing in the First Embodiment

Figure 5:
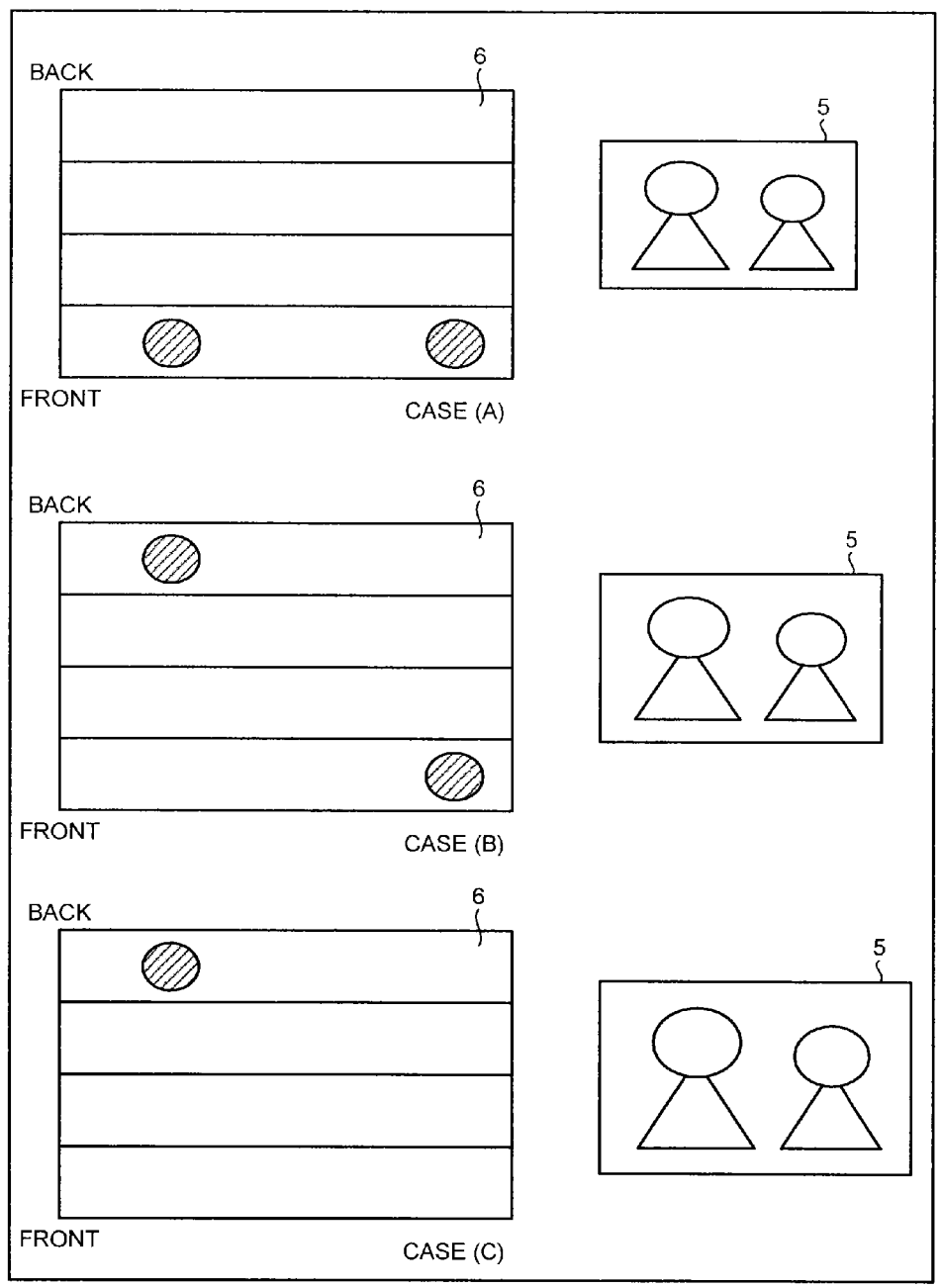
FIG. 5 is a conceptual diagram illustrating results of the information display processing in the first embodiment.

Next, a concept of the information display processing according to the first embodiment is described with reference to FIGS. 4 and 5. FIG. 4 is a conceptual diagram illustrating the information display processing in the first embodiment. FIG. 5 is a conceptual diagram illustrating results (cases (A) to (C)) of the information display processing in the first embodiment. Regarding the "front" and "back" of seats 6 illustrated in FIG. 5, a side nearer to a screen 5 corresponds to "front" and a side farther to the screen 5 corresponds to "back" in the description.

As illustrated in FIG. 4, users are seated at the seats 6 forming a detection target area, and view a projection image projected on the screen 5 by the information processing apparatus 100 (projector 10). The detection devices 20a to 20d are arranged near the seats 6. The example of FIG. 4 illustrates a case where the detection devices 20a to 20d are arranged near the seats 6 in the order of the detection device 20d, the detection device 20c, the detection device 20b, and the detection device 20a from the side nearer to the screen 5. The detection devices 20a to 20d arranged in such a manner capture images of users in each row of the seats 6, and transmit the detection information to the information processing apparatus 100. The conceptual diagram illustrated in FIG. 4 is one example, and the number of the detection device 20 and the arrangement position thereof are not limited to what is exemplified in FIG. 4.

When the users are seated only on the front side of seats 6, as illustrated in the left section of case (A) of FIG. 5, the information processing apparatus 100 determines display control processing for reduced display of a projection image based on the fact that the distance between the users and a screen 5 is equal to or smaller than the first distance, that is, the fact that the distance between the users and the screen 5 is small. Then, the information processing apparatus 100 causes the projector to project the reduced projection image on the screen 5, as illustrated in the right section of case (A of FIG. 5.

When users are seated on both the front side and the back side of seats 6, as illustrated in the left section of case (B) of FIG. 5, that is, unless users are seated only on the front side or the back side, the information processing apparatus 100 determines display control for displaying a generated projection image as it is. Then, the information processing apparatus 100 causes the projector to project the projection image not subjected to reduced or enlarged processing on the screen 5, as illustrated in the right section of case (B) of FIG. 5.

When a user is seated only on the back side of seats 6, as illustrated in the left section of case (C) of FIG. 5, the information processing apparatus 100 determines display control processing for enlarged display of a projection image based on the fact that the distance between the users and a screen 5 is equal to or larger than the second distance, that is, the fact that the distance between the users and the screen 5 is large. Then, the information processing apparatus 100 causes the projector to project the enlarged projection image on the screen 5, as illustrated in the right section of case (C) of FIG. 5.

The user detection is performed in real time. Thus, even if the seating state is changed from one in case (A) of FIG. 5 to one in case (B) of FIG. 5, and further to one in case (C) of FIG. 5, the projection image is always easy to view for the users.

Flow of Information Display Processing in the First Embodiment

Figure 6:
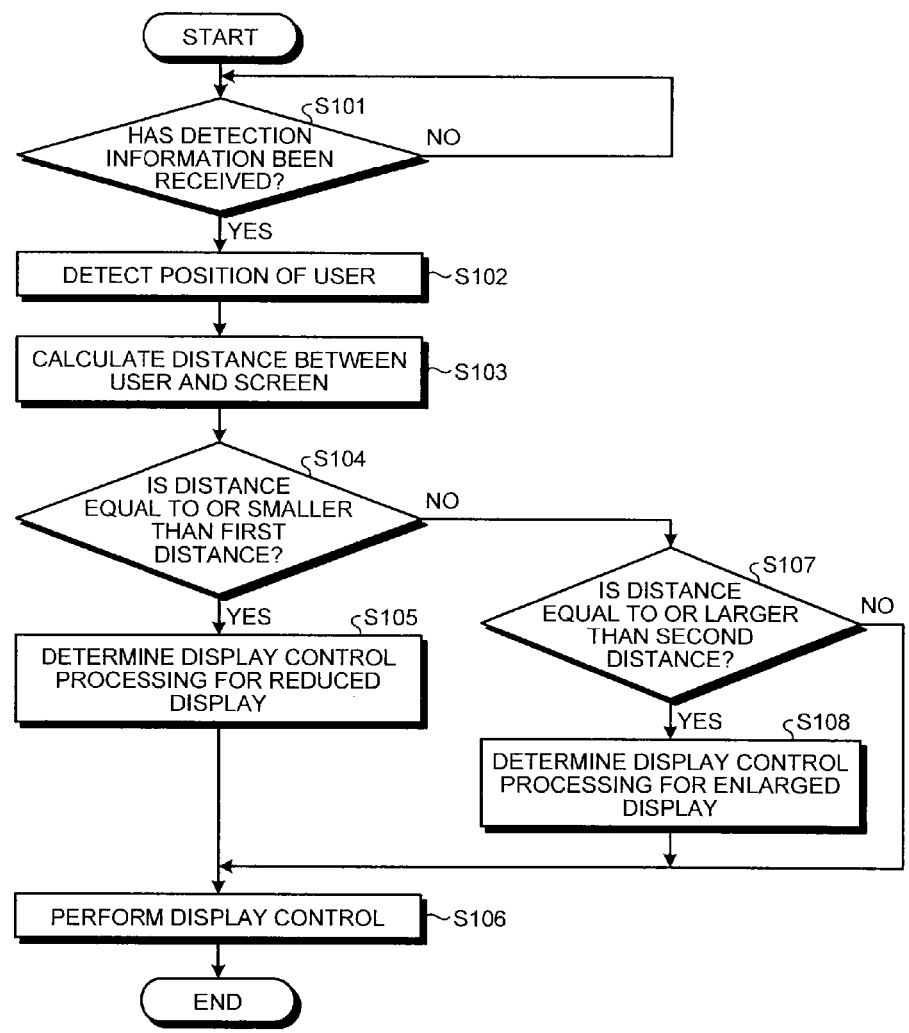
FIG. 6 is a flowchart illustrating an example of the flow of the information display processing in the first embodiment.

Next, the flow of the information display processing according to the first embodiment is described with reference to FIG. 6. FIG. 6 is a flowchart illustrating an example of the flow of the information display processing in the first embodiment.

As illustrated in FIG. 6, upon receiving the detection information transmitted by the detection device 20 (Yes at Step S101), the position detecting unit 121 detects the positions of the users in the detection target area based on the image of the detection target area included in the detection information (Step S102). In the case that the position detecting unit 121 has not received detection information (No at Step S101), the position detecting unit 121 waits for reception of the detection information.

The calculating unit 122 calculates the distances between the users and the screen based on the positions of the users that are detected by the position detecting unit 121 and the predefined screen position information (Step S103). The determining unit 123 determines whether the distances between the users and the screen that are calculated by the calculating unit 122 are equal to or smaller than the first distance (Step S104). If the determining unit 123 determines that the distances are equal to or smaller than the first distance (Yes at Step S104), the determining unit 123 refers to the display control processing storing unit 111 to thereby acquire the display control processing "reduced display" that corresponds to the distance equal to or smaller than the first distance, and determines display control processing for reduced display of a projection image (Step S105). Then, the display control unit 125 reduces the projection image generated by the image generating unit 124, and performs display control for causing the projector 10 to project the reduced projection image (Step S106).

If the determining unit 123 determines that the distances between the users and the screen that are calculated by the calculating unit 122 are not equal to or smaller than the first distance (No at Step S104), the determining unit 123 determines whether the distances are equal to or larger than the second distance (Step S107). If the determining unit 123 determines that the distances are equal to or larger than the second distance (Yes at Step S107), the determining unit 123 refers to the display control processing storing unit 111 to thereby acquire the display control processing "enlarged display" that corresponds to the distance equal to or larger than the second distance, and thus determines display control processing for enlarged display of a projection image (Step S108). Then, the display control unit 125 enlarges the projection image generated by the image generating unit 124, and causes the projector 10 performs display control for causing the projector 10 to project the enlarged projection image (Step S106). If the determining unit 123 determines that the distances are not equal to or larger than the second distance (No at Step S107), the display control unit 125 performs display control for causing the projector 10 to project the projection image generated by the image generating unit 124 without reducing or enlarging it (Step S106).

Effects of the First Embodiment

As described above, the information processing apparatus 100 determines display control processing for reducing or enlarging a projection image to be projected on the screen depending on distances between the users and the screen. Thus, it is possible to perform display control preferable for the users.

Second Embodiment

The first embodiment exemplifies a case where a projection image is reduced or enlarged depending on distances between the screen on which the projection image is projected and the users. A second embodiment of the present invention exemplifies a case where the display control processing for a projection image is determined depending on the positions of the users relative to the screen.

Configuration of an Information Processing Apparatus in the Second Embodiment

Figures 7, 8:
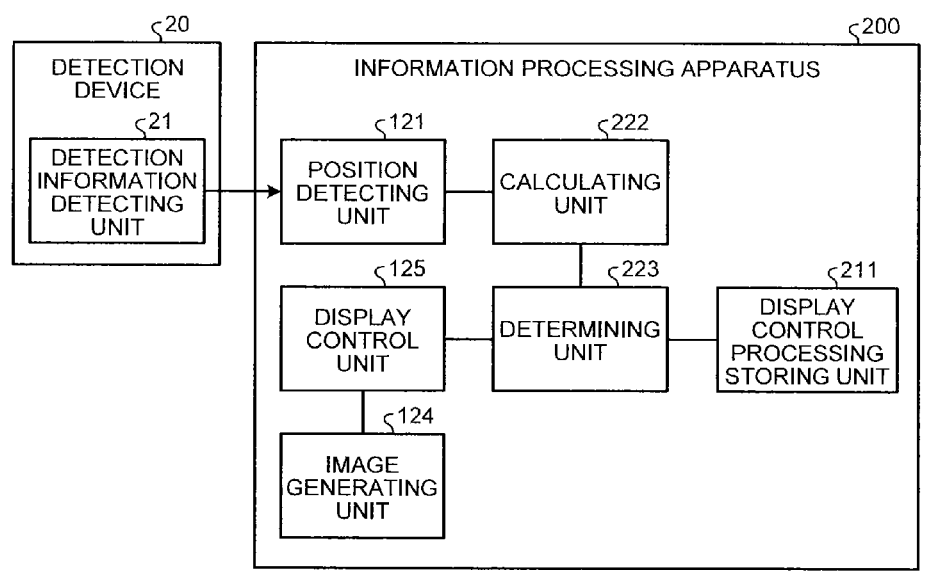
FIG. 7 is a functional block diagram illustrating a configuration example of an information processing apparatus according to a second embodiment of the present invention.
FIG. 8 is a diagram illustrating an example of information stored in a display control processing storing unit in the second embodiment.

The configuration of the information processing apparatus according to the second embodiment is described with reference to FIG. 7. FIG. 7 is a functional block diagram illustrating a configuration example of the information processing apparatus in the second embodiment. In FIG. 7, the components same as in the first embodiment are represented with the same numerals, and the detail description regarding the same components may be omitted. In the second embodiment, the functions, configurations, and processing of units are same as in the first embodiment, except a display control processing storing unit 211, a calculating unit 222, and a determining unit 223, which are described in the following.

As illustrated in FIG. 7, an information processing apparatus 200 includes the display control processing storing unit 211, the position detecting unit 121, the calculating unit 222, the determining unit 223, the image generating unit 124, and the display control unit 125. The detection device 20 includes the detection information detecting unit 21.

The calculating unit 222 calculates the directions of positions of the users that are detected by the position detecting unit 121, relative to the screen, as feature quantities. To be more specific, the calculating unit 222 calculates directions of positions of the users, relative to the screen, in a detection target area, depending on the positional relation between the users in the detection target area and the screen. For example, the calculating unit 222 calculates a state that a "user A" seats at the right end seen from the screen, or a state that a "user B" seats at the left end seen from the screen.

The determining unit 223 determines display control processing for a projection image to be projected on the screen depending on the positions of the users seen from the screen that are calculated by the calculating unit 222. To be more specific, when the users exist at either of the right end or the left end of the detection target area in the horizontal direction of the screen, the determining unit 223 determines display control processing for performing horizontal keystone correction so that the trapezoidal projection image is wider at either the right or left side. The display control processing depending on positions of the users seen from the screen is performed using information stored in the display control processing storing unit 211.

FIG. 8 is a diagram illustrating an example of information stored in the display control processing storing unit 211 in the second embodiment. As illustrated in FIG. 8, the display control processing storing unit 211 stores therein the "user position" representing the position of a user in the detection target area, relative to the screen, and the "display control processing" representing display control processing for a projection image to be projected on the screen in an associated manner. For example, the display control processing storing unit 211 stores therein the user position "seat at left end" and the display control processing "keystone correction display in which the trapezoid is wider at the right side than the left" in an associated manner. In addition, the display control processing storing unit 211 stores therein the user position "seat at right end" and the display control processing "keystone correction display in which the trapezoid is wider at the left side than the right" in an associated manner. That is, the determining unit 223 refers to the display control processing storing unit 211, and determines the display control processing for performing keystone correction so that the trapezoidal projection image is wider at the right side than the left when the users are seated only on the left end of the detection target area, seen from the screen, and determines display control processing for performing keystone correction so that the trapezoidal projection image is wider at the left side than the right when the users are seated only on the right end of the detection target area, seen from the screen.

Concept of Information Display Processing in the Second Embodiment

Figure 9:
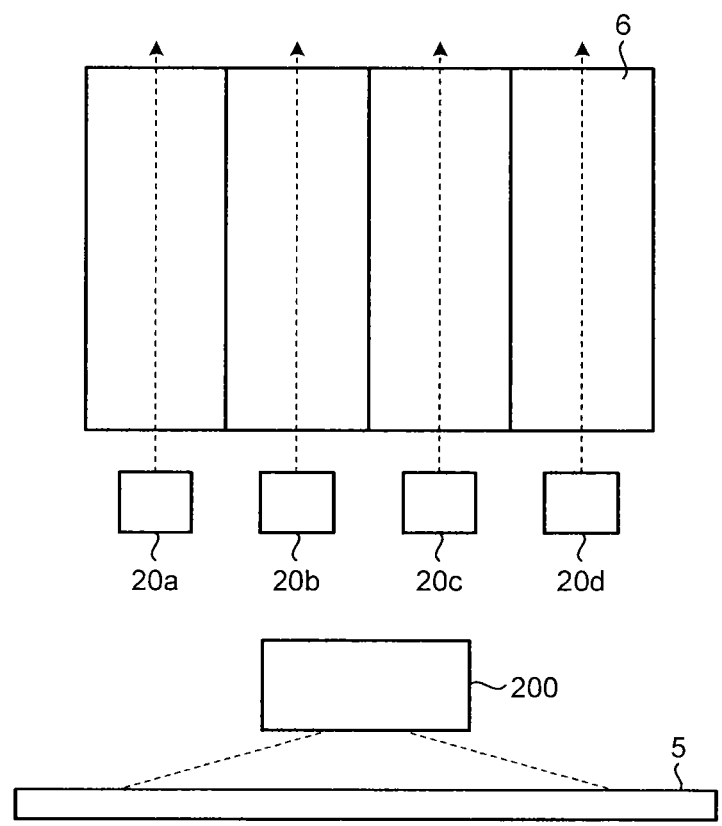
FIG. 9 is a conceptual diagram illustrating information display processing in the second embodiment.
Figure 10:
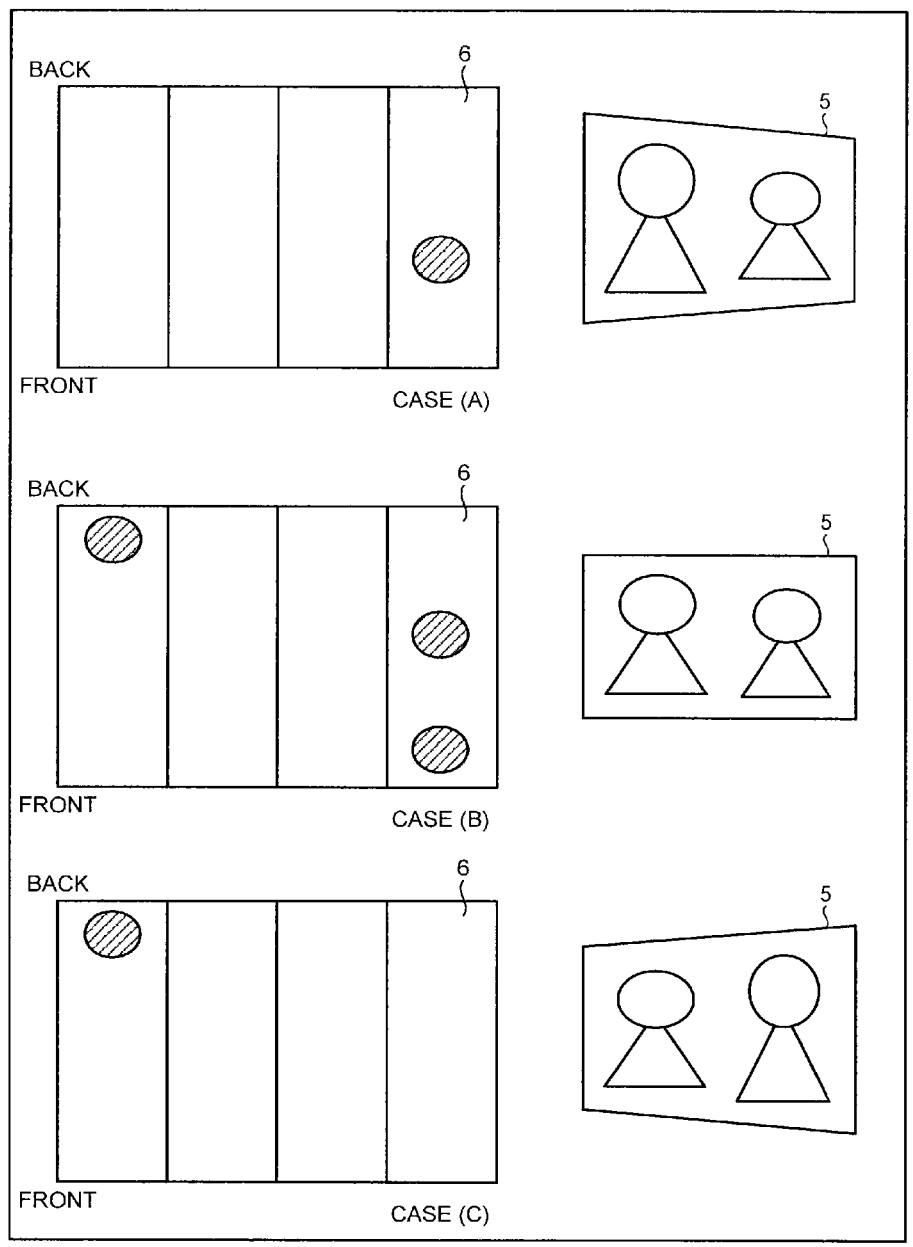
FIG. 10 is a conceptual diagram illustrating results of the information display processing in the second embodiment.

Next, a concept of the information display processing according to the second embodiment is described with reference to FIGS. 9 and 10. FIG. 9 is a conceptual diagram illustrating the information display processing in the second embodiment. FIG. 10 is a conceptual diagram illustrating results of the information display processing in the second embodiment.

As illustrated in FIG. 9, users are seated at the seats 6 forming a detection target area, and view a projection image projected on the screen 5 by the information processing apparatus 200 (projector 10). The detection devices 20a to 20d are arranged near the seats 6. The example of FIG. 9 illustrates a case where the detection devices 20a to 20d are arranged near the seats 6 in the order of the detection device 20a, the detection device 20b, the detection device 20c, and the detection device 20d from the left side seen from the screen 5. The detection devices 20a to 20d arranged in such a manner capture images of the users in each row of the seats 6, and transmit the detection information to the information processing apparatus 200. The conceptual diagram illustrated in FIG. 9 is one example, and the number of the detection device 20 and the arrangement position thereof are not limited to what is exemplified in FIG. 9.

When a user is seated only on the right end of the seats 6 seen from the screen 5, as illustrated in the left section of case (A) of the FIG. 10, the information processing apparatus 200 determines display control processing for performing keystone correction so that the trapezoidal projection image is wider at the left side than the right. Then, the information processing apparatus 200 performs projection processing for causing the projector 10 to project, on the screen 5, the projection image subjected to the keystone correction so that the trapezoidal projection image is wider at the left side than the right, as illustrated in the right section of case (A) of FIG. 10. That is, when the user is seated only on the right end of the detection target area seen from the screen, the information processing apparatus 200 performs the keystone correction for the projection image so that the trapezoidal projection image is wider at the left side than the right, in order to allow the user to easily view the image on the side of the left end that is positioned far from the user.

When users are seated at the left end and the right end of the seats 6 seen from the screen 5, as illustrated in the left section of case (B) of FIG. 10, the information processing apparatus 200 determines display control for displaying a generated projection image as it is. Then, the information processing apparatus 200 performs projection processing for causing the projector 10 to project the projection image not subjected to the keystone correction on the screen 5, as illustrated in the right section of case (B) of FIG. 10.

When a user is seated only on the left end of the seats 6 seen from the screen 5, as illustrated in the left section of case (C) FIG. 10, the information processing apparatus 200 determines display control processing for performing keystone correction so that the trapezoidal projection image is wider at the right side than the left. Then, the information processing apparatus 200 performs projection processing for causing the projector 10 to project, on the screen 5, the projection image subjected to the keystone correction so that the trapezoidal projection image is wider at the right side than the left, as illustrated in the right section of case (C) of FIG. 10. That is, when the user is seated only on the left end of the detection target area seen from the screen, the information processing apparatus 200 performs the keystone correction for the projection image so that the trapezoidal projection image is wider at the right side than the left, in order to allow the user to easily view the image on the side of the right end that is positioned far from the user. It is also possible to further perform, in addition to the keystone correction, display control for reducing the projection image when the user is seated at the front side or display control for enlarging the projection image when the user is seated at the back side, similarly to the first embodiment.

Flow of Information Display Processing in the Second Embodiment

Figure 11:
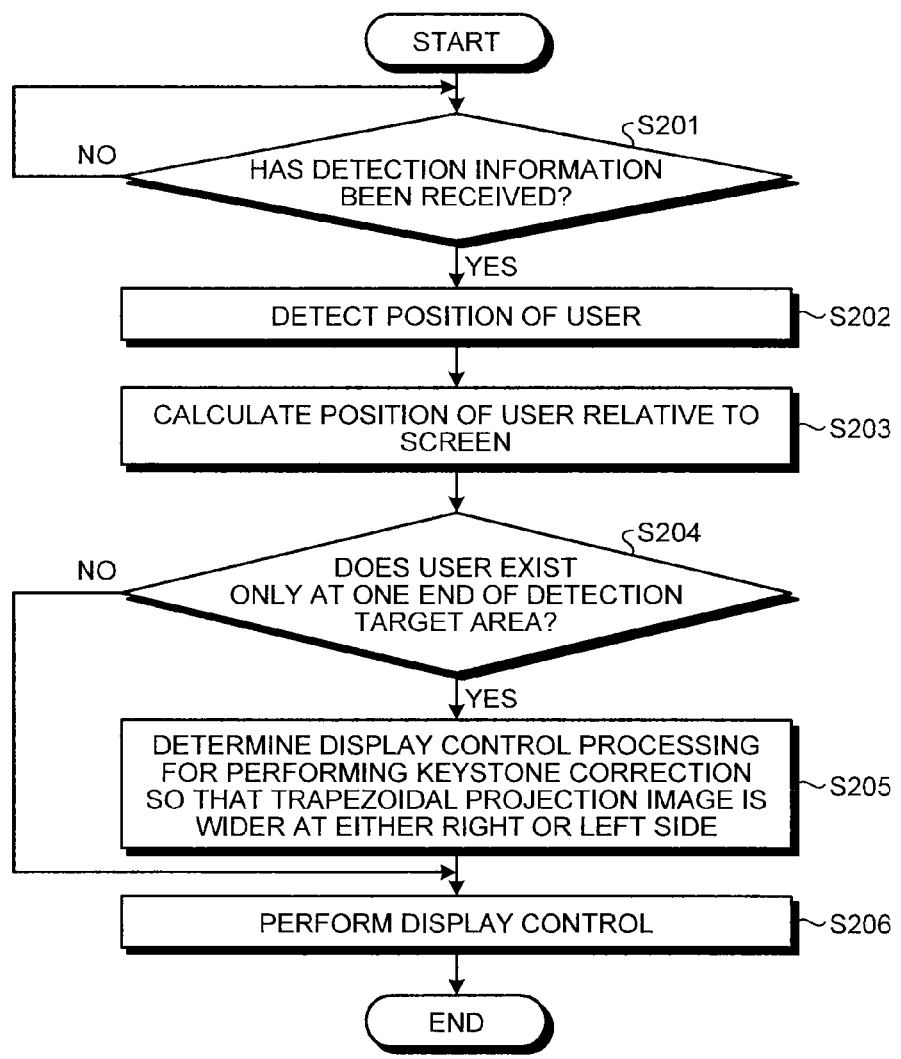
FIG. 11 is a flowchart illustrating an example of the flow of the information display processing in the second embodiment.

Next, the flow of the information display processing according to the second embodiment is described with reference to FIG. 11. FIG. 11 is a flowchart illustrating an example of the flow of the information display processing in the second embodiment. In FIG. 11, the description regarding the same processing as the information display processing in the first embodiment may be omitted. To be more specific, the processing at Step S201 and Step S202 is same as the processing at Step S310 and Step S102.

As illustrated in FIG. 11, the calculating unit 222 calculates the positions of the users in the detection target area, relative to the screen, based on the relation between the positions of the users that are detected by the position detecting unit 121 and the position of the screen (Step S203). The determining unit 223 determines whether the positions of the users seen from the screen that are calculated by the calculating unit 222 are only at the right end or the left end of the detection target area (Step S204).

If the determining unit 223 determines that the users are positioned only at the right end or the left end (Yes at Step S204), it refers to the display control processing storing unit 211 to thereby acquire the display control processing "keystone correction display in which the trapezoid is wider at the left side than the right" that corresponds to the user position "seat at the right end" or acquire the display control processing "keystone correction display in which the trapezoid is wider at the right side than the left" that corresponds to the user position "seat at the left end", and determines display control processing for a projection image (Step S205). Then, the display control unit 125 performs the keystone correction for the projection image generated by the image generating unit 124, and performs display control for causing the projector 10 to project the projection image subjected to the keystone correction on the screen (Step S206).

If the determining unit 223 determines that the users are seated not only at the right end or the left end but also at other position (No at Step S204), the display control unit 125 performs display control for causing the projector 10 to project the projection image generated by the image generating unit 124 without performing keystone correction (Step S206).

Effects of the Second Embodiment

As described above, the information processing apparatus 200 determines display control processing for performing keystone correction for a projection image to be projected on the screen depending on the positions of the users relative to the screen. Thus, it is possible to perform control display preferable for the users.

Third Embodiment

The first and second embodiments each exemplify a case where display control processing for a projection image is determined depending on the distances between the users and the screen on which the projection image is to be projected, or the positions of the users relative to the screen. A third embodiment exemplifies a case where display control processing for a projection image is determined depending on the position of a concentrated area where the users are seated near to one another in a concentrated manner.

Configuration of an Information Processing Apparatus in the Third Embodiment

Figures 12, 13:
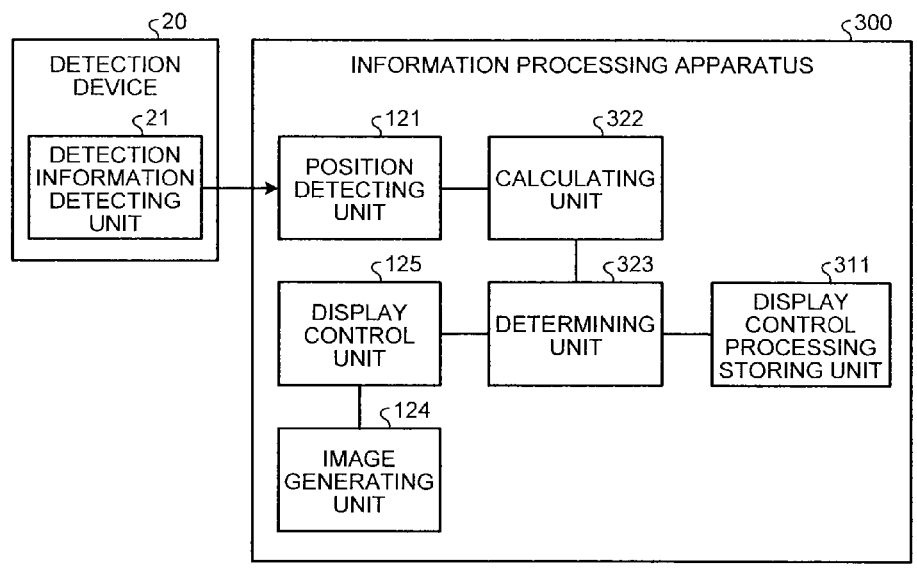
FIG. 12 is a functional block diagram illustrating a configuration example of an information processing apparatus according to a third embodiment of the present invention.
FIG. 13 is a diagram illustrating an example of information stored in a display control processing storing unit in the third embodiment.

The configuration of the information processing apparatus according to the third embodiment is described with reference to FIG. 12. FIG. 12 is a functional block diagram illustrating a configuration example of the information processing apparatus in the third embodiment. In FIG. 12, the components same as in the first embodiment are represented with the same numerals, and the detail description regarding the same components may be omitted. In the third embodiment, the functions, configurations, and processing of units are same as in the first embodiment, except a display control processing storing unit 311, a calculating unit 322, and a determining unit 323, which are described in the following.

As illustrated in FIG. 12, an information processing apparatus 300 includes the display control processing storing unit 311, the position detecting unit 121, the calculating unit 322, the determining unit 323, the image generating unit 124, and the display control unit 125. The detection device 20 includes the detection information detecting unit 21.

The calculating unit 322 calculates, as feature quantities, the respective positions, relative to the screen, of concentrated areas where the users detected by the position detecting unit 121 exist in a concentrated manner. To be more specific, the calculating unit 322 calculates the concentrated area regarding users exiting with a given distance to one another in a concentrated manner, among the users in the detection target area, as one area. Then, the calculating unit 322 calculates the positions of the concentrated areas in the detection target area, relative to the screen, based on the positional relation between the concentrated areas included in the detection target area and the screen.

The given distance may be space for one seat or space for a given number of seats, for example. That is, when one person has another person who is seated adjacent to him/her, a concentrated area is calculated regarding the person and such another person who is seated adjacent to him/her as one area. For example, the calculating unit 322 regards an area including "user A", "user B", and "user C" who are on the seats next to one another or on the back and front seats as a "concentrated area X", and calculates that the "concentrated area X" is positioned on the back side relative to the screen. Alternatively, the calculating unit 322 regards an area including "user D" and "user E" as a "concentrated area Y", and calculates that the "concentrated area Y" is positioned on the left side seen from the screen.

The determining unit 323 determines display control processing for a projection image to be projected on the screen depending on the position of the concentrated area relative to the screen that is calculated by the calculating unit 322. To be more specific, when the concentrated area is positioned on the front side or the back side of the detection target area relative to the screen, the determining unit 323 determines display control processing for reducing or enlarging the projection image. In addition, when the concentrated area is positioned on the right side or the left side of the detection target area in a horizontal direction of the screen, the determining unit 323 determines display control processing for performing keystone correction so that the trapezoidal projection image is wider at either the right or left side. The display control processing depending on the position of the concentration area relative to the screen is performed using information stored in the display control processing storing unit 311.

FIG. 13 is a diagram illustrating an example of information stored in the display control processing storing unit 311 according to the third embodiment. As illustrated in FIG. 13, the display control processing storing unit 311 stores therein the "position of concentrated area" representing the position of the concentrated area relative to the screen and the "display control processing" representing display control processing for a projection image to be projected on the screen in an associated manner. For example, the display control processing storing unit 311 stores therein the position of the concentrated area "front side" and the display control processing "reduced display" in an associated manner. Alternatively, the display control processing storing unit 311 stores therein the position of the concentrated area "left side" and the display control processing "keystone correction display in which the trapezoid is wider at the right side than the left" in an associated manner. That is, the determining unit 323 refers to the display control processing storing unit 311, and determines display control processing for reduced display when the concentrated area is positioned on the front side relative to the screen, and determines display control processing for performing keystone correction so that the trapezoidal projection image is wider at the right side than the left when the concentrated area is positioned on the left side seen from the screen.

Concept of Information Display Processing in the Third Embodiment

Figure 14:
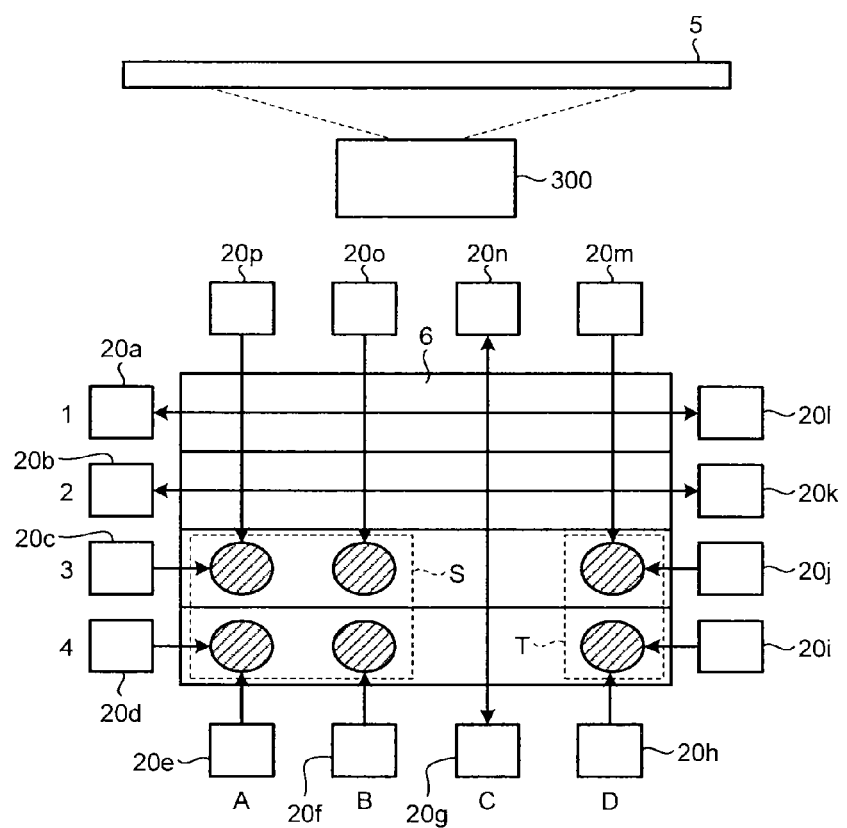
FIG. 14 is a conceptual diagram illustrating information display processing in the third embodiment.

Next, a concept of the information display processing according to the third embodiment is described with reference to FIG. 14. FIG. 14 is a conceptual diagram illustrating the information display processing in the third embodiment.

As illustrated in FIG. 14, users are positioned at the seats 6 forming a detection target area, and view a projection image that is projected on the screen 5 with the information processing apparatus 300 (projector 10). The detection devices 20a to 20p are arranged near the seats 6. The example of FIG. 14 illustrates a case where the detection devices 20a to 20d are arranged near the seats 6 on the right side seen from the screen 5 in the order of the detection device 20a, the detection device 20b, the detection device 20c, and the detection device 20d from a position nearer to the screen 5.

Similarly, the detection devices 20e to 20h are arranged near the back side of the seats 6 in the order of the detection device 20e, the detection device 20f, the detection device 20g, and the detection device 20h from the right side seen from the screen 5. Similarly, the detection devices 20i to 20l are arranged near the seats 6 on the left side seen from the screen 5 in the order of the detection device 20l, the detection device 20k, the detection device 20j, and the detection device 20i from a position nearer to the screen 5. Similarly, the detection devices 20m to 20p are arranged near the front side of the seats 6 in the order of the detection device 20p, the detection device 20o, the detection device 20n, and the detection device 20m from the right side seen from the screen 5.

The users are seated in a concentrated manner at "A4", "A3", "B4", and "B3" in FIG. 14. Thus, the information processing apparatus 300 regards such one part of the detection target area as a "concentrated area S". Moreover, the users are seated in a concentrated manner at "D4" and "D3" in FIG. 14. Thus, the information processing apparatus 300 regards such one part of the detection target area as a "concentrated area T".

Here, a case where there is only the concentrated area "concentrated area S" illustrated in FIG. 14 is described. For example, the information processing apparatus 300 accurse the display control processing "keystone correction display in which the trapezoid is wider at the left side than the right" and the "enlarged display" by referring to the display control processing storing unit 311, based on the fact that the concentrated area "concentrated area S" is positioned on the right and back side seen from the screen 5, and determines display control processing for performing enlarged display of a projection image and keystone correction so that the trapezoidal projection image is wider at the left side than right.

Next, a case where there is only the concentrated area "concentrated area T" illustrated in FIG. 14 is described. For example, the information processing apparatus 300 acquires the display control processing "keystone correction display in which the trapezoid is wider at the right side than the left" and the "enlarged display" by referring to the display control processing storing unit 311, based on the fact that the concentrated area "concentrated area T" is positioned on the left and back side seen from the screen 5, and determines display control processing for performing enlarged display of a projection image and keystone correction so that the trapezoidal projection image is wider at the right side than the left.

Moreover, a case where there are both the concentrated area "concentrated area S" and the concentrated area "concentrated area T" illustrated in FIG. 14 is described. For example, the information processing apparatus 30C acquires the common display processing "enlarged display" by referring to the display control processing storing unit 311, based on the fact that both the concentrated area "concentrated area S" and the concentrated area "concentrated area T" are positioned on the back side, and determines display control processing for enlarged display of a projection image.

Flow of Information Display Processing in the Third Embodiment

Figure 15:
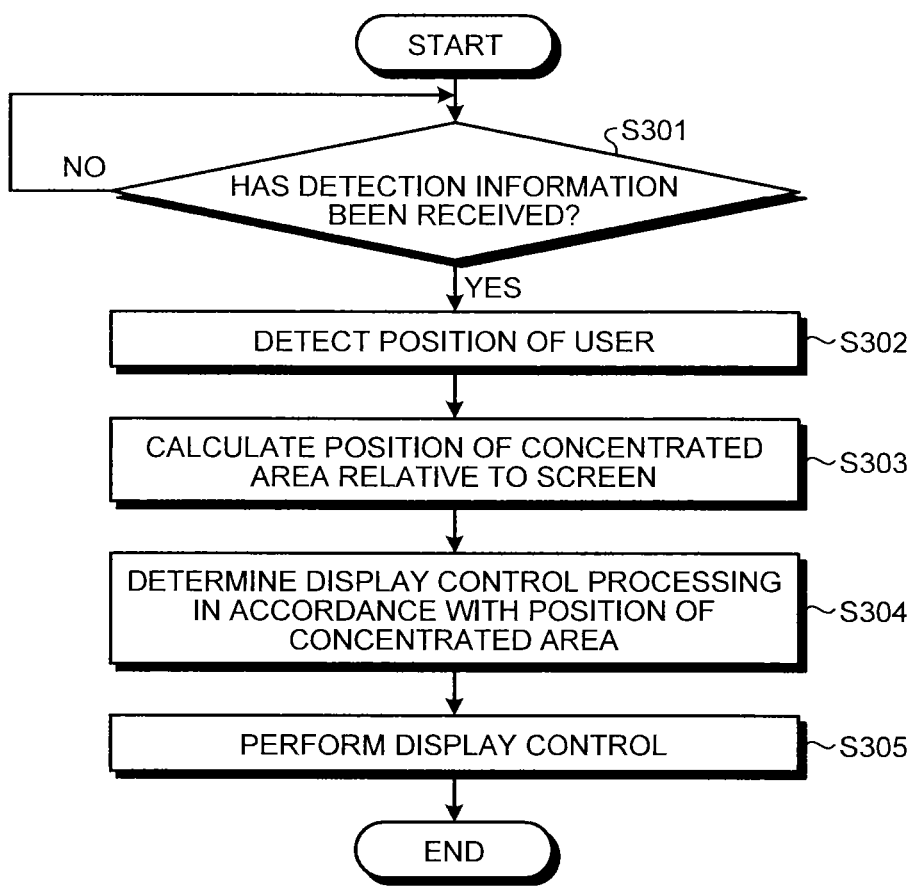
FIG. 15 is a flowchart illustrating an example of the flow of the information display processing in the third embodiment.

Next, the flow of the information display processing according to the third embodiment is described with reference to FIG. 15. FIG. 15 is a flow chart illustrating an example of the flow of the information display processing in the third embodiment. In FIG. 15, the description regarding the same processing as the information display processing in the first embodiment may be omitted. To be more specific, the processing at Step S301 and Step S302 is same as the processing at Step S101 and Step S102.

As illustrated in FIG. 15, the calculating unit 322 finds a concentrated area regarding users seated in a concentrated manner as one area based on the positions of the users that are detected by the position detecting unit 121, and calculates the position of the concentrated area relative to the screen (Step S303). The determining unit 323 acquires display control processing corresponding to the position of the concentrated area relative to the screen that is calculated by the calculating unit 322 by referring to the display control processing storing unit 311, and determines display control processing for a projection image (Step S304). Then, the display control unit 125 corrects the projection image generated by the image generating unit 124 in accordance with the display control processing determined by the determining unit 323, and performs display control for projecting the corrected projection image with the projector 10 (Step S305).

Effects of the Third Embodiment

As described above, the information processing apparatus 300 determines display control processing for correcting a projection image to be projected on the screen depending on the position of an area where a plurality of users exist in a concentrated manner, relative to the screen. Thus, it is possible to perform display control preferable for the users.

Fourth Embodiment

The third embodiment exemplifies a case where display control processing for a projection image is determined depending on the position of the concentrated area relative to the screen on which the projection image is to be projected. A fourth embodiment exemplifies display control for a projection image performed when a user in the concentrated area has left the concenrated area.

Configuration of an Information Processing Apparatus in the Fourth Embodiment

Figures 16, 17:
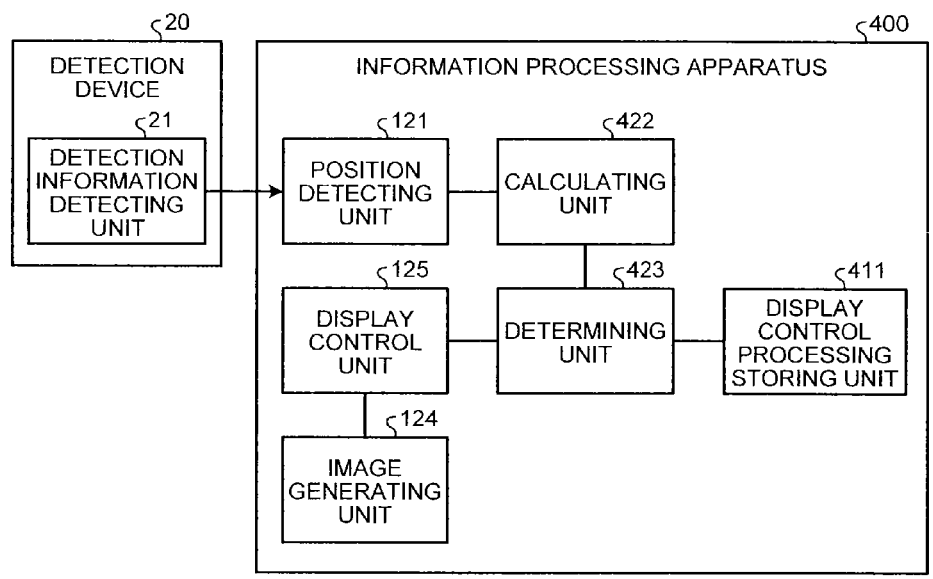
FIG. 16 is a functional block diagram illustrating a configuration example of an information processing apparatus according to a fourth embodiment of the present invention.
FIG. 17 is a diagram illustrating an example of information stored in a display control processing storing unit in the fourth embodiment.

The configuration of the information processing apparatus according to the fourth embodiment is described with reference to FIG. 16. FIG. 16 is a functional block diagram illustrating a configuration example of the information processing apparatus in the fourth embodiment. In FIG. 16, the components same as in the first embodiment are represented with the same numerals, and the detail description regarding the same components may be omitted. In the fourth embodiment, the functions, configurations, and processing of units are same as in the first embodiment, except a display control processing storing unit 411, a calculating unit 422, and a determining unit 423

As illustrated in FIG. 16, an information processing apparatus 400 includes the display control processing storing unit 411, the position detecting unit 121, the calculating unit 422, the determining unit 423, the image generating unit 124, and the display control unit 125. The detection device 20 includes the detection information detecting unit 21.

The calculating unit 422 calculates the respective positions, relative to the screen, of concentrated areas where the users exist in a concentrated manner that are detected by the position detecting unit 121, as feature quantities. When the calculated concentrated area is reduced and the position of a user is detected outside the concentrated area, the calculating unit 422 calculates a distance between the position of the user and the screen. To be more specific, the calculating unit 422 calculates the concentrated area regarding users existing with a given distance to one another in a concentrated manner, among the users in the detection target area, as one area. Then, the calculating unit 422 calculates the positions of the concentrated areas in the detection target area, relative to the screen, based on the positional relation between the concentrated areas included in the detection target area and the screen.

Thereafter, when the calculated concentrated area is reduced and the position of a user is detected outside the concentrated area but in the detection target area, that is, when the user has left the concentrated area to another position in the detection target area, the calculating unit 422 calculates the distance between the position of the user having moved to such another position and the screen based on the position of the user detected by the position detecting unit 121.

The determining unit 423 determines display control processing for a projection image to be projected on the screen depending on the position of the concentrated area relative to the screen that is calculated by the calculating unit 422. Moreover, the determining unit 423 determines display control processing for a projection image to be projected on the screen depending on the distance between the screen and the users that are calculated by the calculating unit 422.

To be more specific, when the concentrated area is positioned on the front side or the back side of the detection target area, relative to the screen, the determining unit 423 determines display control processing for reducing or enlarging a projection image. In addition, when the concentrated area is positioned on the right side or the left side of the detection target area in the horizontal direction of the screen, the determining unit 423 determines display control processing for performing keystone correction so that the trapezoidal projection image is wider at either the right side or the left side. Such display control processing is performed using information same as the information stored in the display control processing storing unit 311 in the third embodiment.

After calculating the concentrated area and determining the display control processing, the determining unit 423 receives the distance between the user having left the concentrated area and the screen from the calculating unit 422. Then, the determining unit 423 determines whether the distance between the user and the screen that is calculated by the calculating unit 422 is equal to or smaller than the first distance, and determines display control processing for enlarging a projection image to be projected on the screen when the distance is equal to or smaller than the first distance. Moreover, the determining unit 423 determines whether the distance between the user and the screen that is calculated by the calculating unit 422 is equal to or larger than the second distance, and determines display control processing for reducing a projection image to be projected on the screen when the distance is equal to or larger than the second distance. Here, the relation between the first distance and the second distance is "first distance<second distance", similarly to the first embodiment. The display control processing in accordance with the distance equal to or smaller than the first distance or the distance equal to or larger than the second embodiment is performed using information stored in the display control processing storing unit 411.

FIG. 17 is a diagram illustrating an example of information stored in the display control processing storing unit 411 according to the fourth embodiment. As illustrated in FIG. 17, the display control processing storing unit 411 stores therein the distance between the position of a user and the screen, the user being detected at another position in the detection target area when the concentrated area is reduced, that is, the "distance" representing the distance between the position of the user having left the concentrated area and the screen and the "display control processing" representing display control processing for a projection image to be projected on the screen in an associated manner. For example, the display control processing storing unit 411 stores therein the distance "equal to or smaller than the first embodiment" and the display control processing "enlarged display" in an associated manner. In addition, the display control processing storing unit 411 stores therein the distance "equal to or larger than the second embodiment" and the display control processing "reduced display" in an associated manner. That is, the determining unit 423 refers to the display control processing storing unit 411, and determines display control processing for enlarged display when the distance is equal to or smaller than the first distance, and determines display control processing for reduced display when the distance is equal to or larger than the second distance.

In short, when the position of the user having left the concentrated area is near to the screen (equal to or smaller than the first distance), the determining unit 423 determines display control processing for enlarged display assuming that the user has moved to a position nearer to the screen because the previous display is small and it is difficult to view it. Similarly, when the position of the user having left the concentrated area is far to the screen (equal to or larger than the second distance), the determining unit 423 determines display control processing for reduced display assuming that the user has moved to a position farther to the screen because the previous display is large and it is difficult to view it.

Concept of Information Display Processing in the Fourth Embodiment

Figure 18:
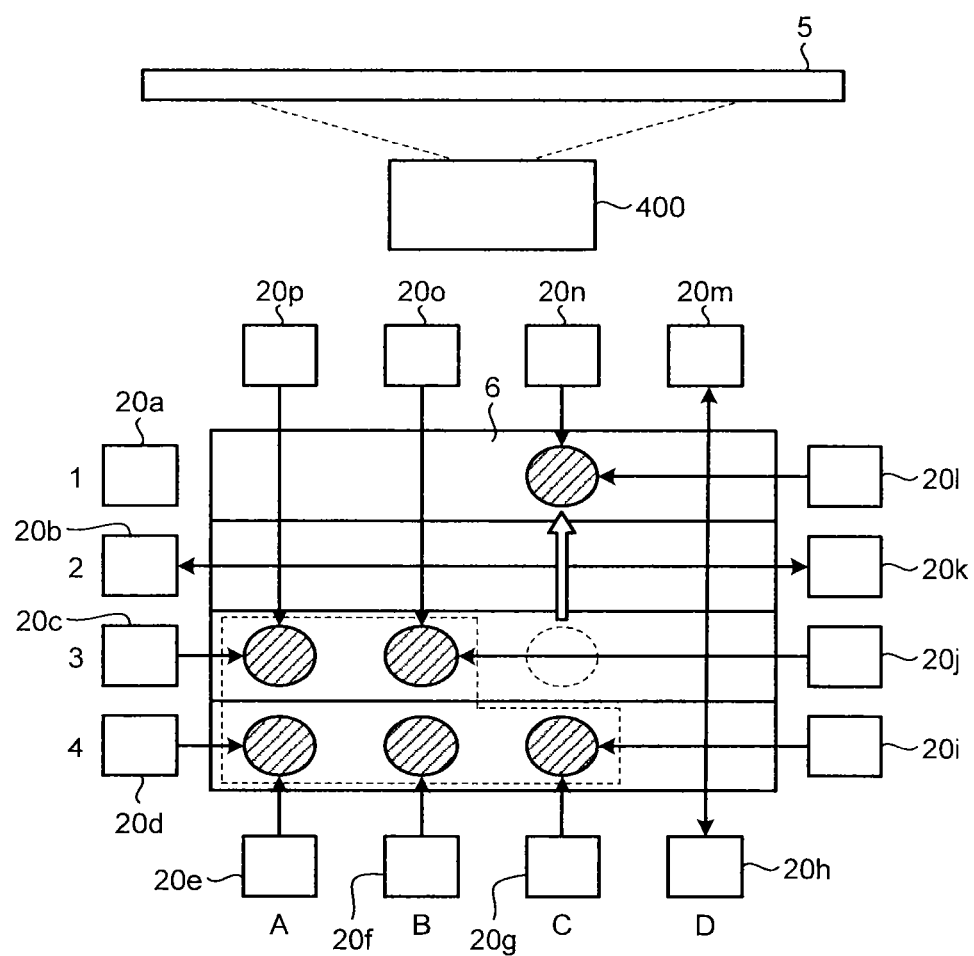
FIG. 18 is a conceptual diagram illustrating information display processing in the fourth embodiment.

Next, a concept of the information display processing according to the fourth embodiment is described with reference to FIG. 18. FIG. 18 is a conceptual diagram illustrating the information display processing in the fourth embodiment. FIG. 18 exemplifies a case that a user in the concentrated area positioned on the back side of the detection target area is moved to a position nearer to the screen.

As illustrated in FIG. 18, users are positioned on the seats 6 forming a detection target area, and view a projection image that is projected on the screen 5 with the information processing apparatus 400 (projector 10). The detection devices 20a to 20p are arranged near the seats 6. The arrangement example of the detection devices 20a to 20p in FIG. 18 is same as in the third embodiment.

The users are seated in a concentrated manner at "A4", "A3", "B4", "B3", "C4", and "C3" in FIG. 18. Thus, the information processing apparatus 400 regards such one part of the detection target area as a "concentrated area U (not illustrated)". The concentrated area "concentrated area U" is positioned on the back side relative to the screen 5. Thus, the information processing apparatus 400 determines display control processing for enlarged display of a projection image with respect to the "concentrated area U".

Here, a case where a user positioned at "C3" in the concentrated area "concentrated area U" has moved to "C1" is described. For example, when the concentrated area "concentrated area U" is reduced and the position of a user is detected outside the concentrated area "concentrated area U" but in the detection target area, the information processing apparatus 400 calculates the distance between the detected position of the user ("C1") and the screen 5. Then, the information processing apparatus 400 acquires the display control processing "enlarged display" by referring to the display control processing storing unit 411, based on the fact that the distance between the screen 5 and the position "C1" is equal to or smaller than the first distance, and determines display control processing for enlarged display of a projection image. That is, in the example of FIG. 18, although the projection image was enlarged for display in accordance with the position of the concentrated area "concentrated area U" relative to the screen 5, the user has found it difficult to view the display because it is still small and has moved from "C3" to "C1", so that the enlarged projection image is further enlarged for display.

Figure 19:
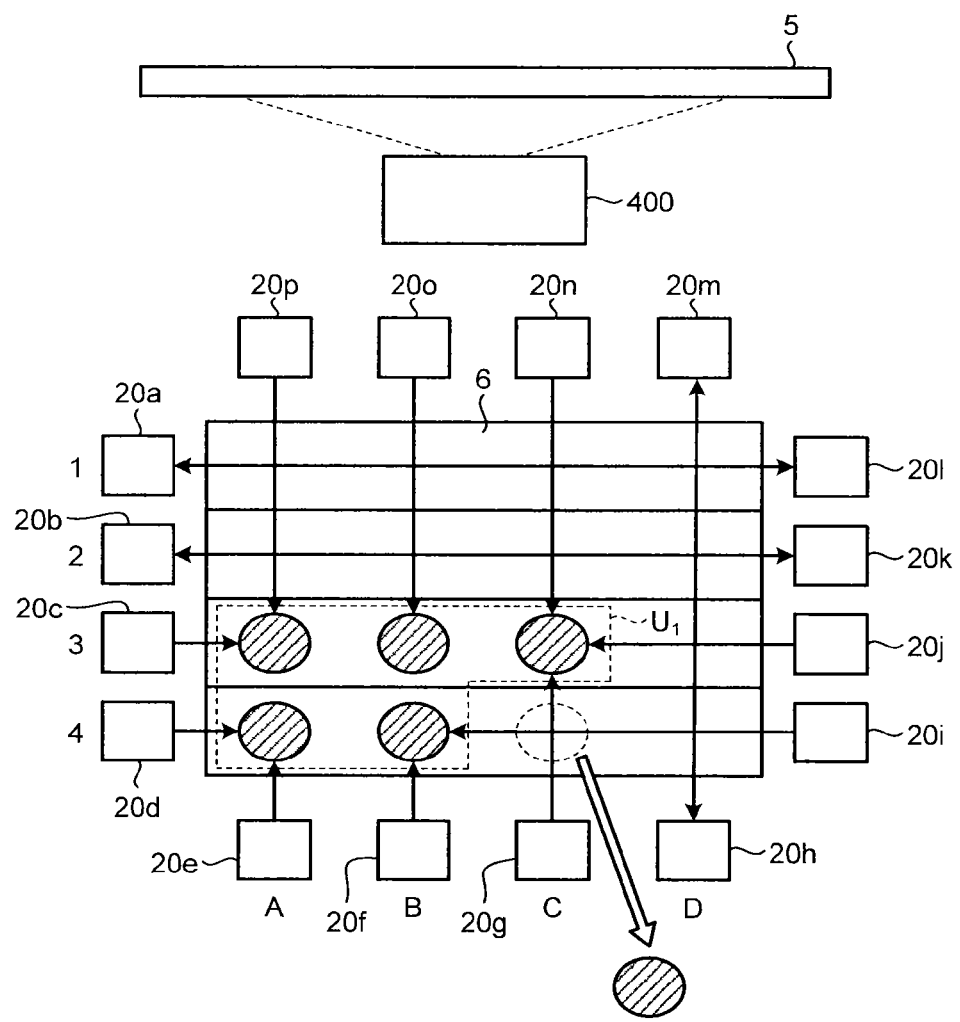
FIG. 19 is a conceptual diagram illustrating a state that a user in a concentrated area has left a detection target area.

However, when only the concentrated area "concentrated area U" is reduced, the information processing apparatus 400 only performs display control with respect to a new concentrated area. FIG. 19 illustrates an image in which a user in the concentrated area has left the detection target area. As illustrated in FIG. 19, when the user at "C4" in the concentrated area "concentrated area U" has left the detection target area, the information processing apparatus 400 performs display control ("enlarged display", for example) with respect to a concentrated area "concentrated area $U_1$" regarding "A4", "A3", "B4", "B3", and "C3" as one area. Moreover, when the user at "C3" also has left the detection target area in the example of FIG. 19, the information processing apparatus 400 performs display control ("enlarged display", "keystone correction in which the trapezoid is wider at left side than the right", for example) with respect to a concentrated area "concentrated area $U_2$ (not illustrated)" regarding "A4", "A3", "B4", and "B3" as one area.

Flow of Information Display Processing in the Fourth Embodiment

Figure 20:
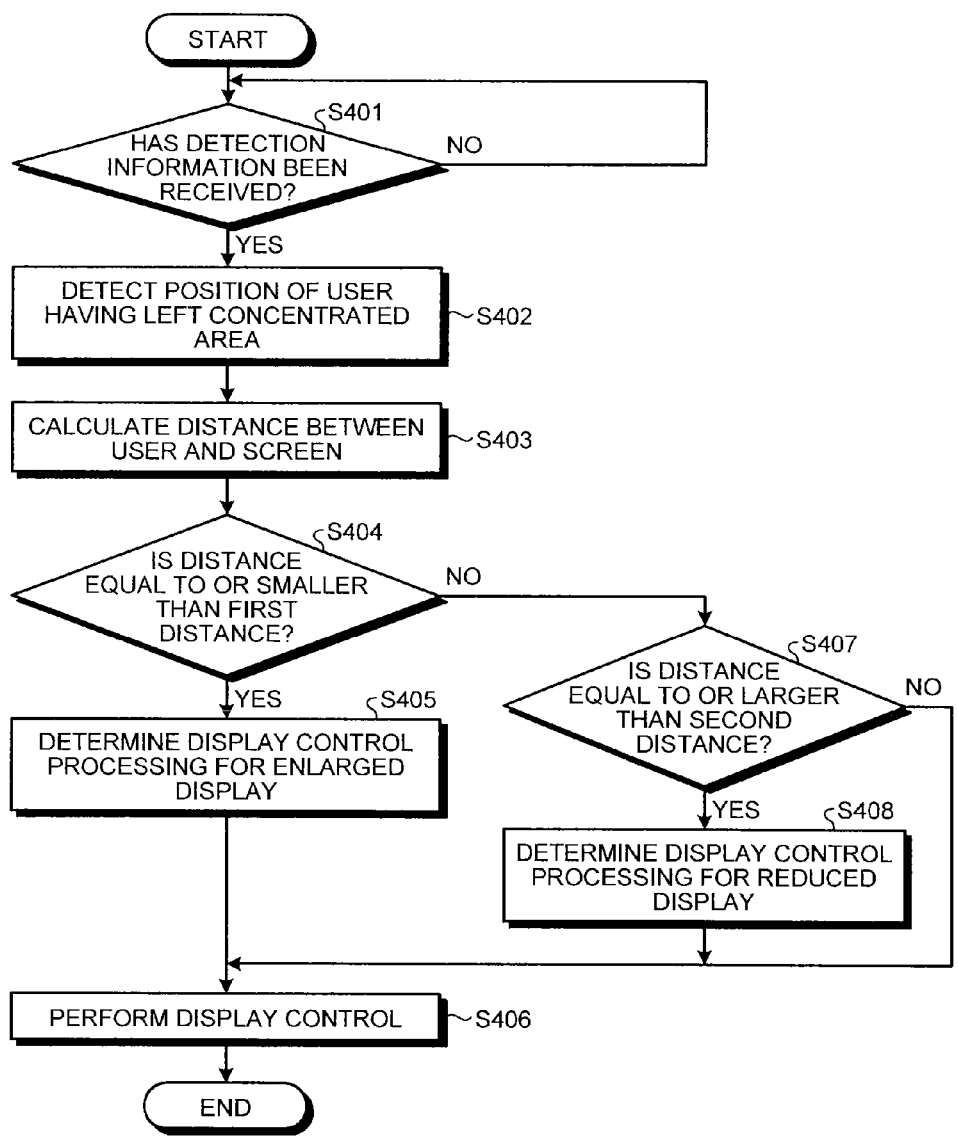
FIG. 20 is a flowchart illustrating an example of the flow of the information display processing in the fourth embodiment.

Next, the flow of the information display processing according to the fourth embodiment is described with reference to FIG. 20. FIG. 20 is a flowchart illustrating an example of the flow of the information display processing in the fourth embodiment. FIG. 20 exemplifies the flow of the information display processing performed in a state that the display control is performed depending on the position of the concentrated area relative to the screen.

As illustrated in FIG. 20, upon receiving the detection information transmitted by the detection device 20 (detection devices 20a to 20p) (Yes at Step S401), the position detecting unit 121 detects the position of the user having left the concentrated area by detecting the positions of the users in the detection target area based on an image of the detection target area included in the detection information (Step S402). When the position detecting unit 121 has not received the detection information (No at Step S401), it waits for reception of the detection information.

The calculating unit 422 calculates the distances between the users and the screen based on the positions of the users detected by the position detecting unit 121 and predefined position information of the screen (Step S403). The determining unit 423 determines whether the distance between the user and the screen that is calculated by the calculating unit 422 is equal to or smaller than the first distance (Step S404).

If the determining unit 423 determines that the distance is equal to or smaller than the first distance (Yes at Step S104), it acquires the display control processing "enlarged display" that corresponds to the distance equal to or smaller than the first distance by referring to the display control processing storing unit 411, and determines display control processing for enlarged display of a projection image (Step S405). Then, the display control unit 325 enlarges the projection image generated by the image generating unit 124, and performs display control for projecting the enlarged projection image with the projector 10 (Step S406).

If the determining unit 423 determines that the distance between the user and the screen that is calculated by the calculating unit 422 is not equal to or smaller than the first distance (No at Step S404), it determines whether the distance is equal to or larger than the second distance (Step S407). If the determining unit 423 determines that the distance is equal to or larger than the second distance (Yes at Step S407), the determining unit 423 acquires the display control processing "reduced display" that corresponds to the distance equal to or larger than the second distance by referring to the display control processing storing unit 411, and determines display control processing reduced display of a projection image (Step S408). Then, the display control unit 125 reduces the projection image generated by the image generating unit 124, and performs display control for projecting the reduced projection image with the projector 10 (Step S406). By contrast, if the determining unit 423 determines that the distance is not equal to or larger than the second distance (No at Step S407), the display control unit 125 performs display control for projecting the projection image generated by the image generating unit 124 with the projector 10 without reducing or enlarging the projection image (Step S406).

Effects of the Fourth Embodiment

As described above, the information processing apparatus 400 determines display control processing for a projection image to be projected on the screen depending on the position of the concentrated area relative to the screen, and the distance between the screen and the user having left the concentrated area. Thus, it is possible to perform display control preferable for the users.

Fifth Embodiment

The fourth embodiment exemplifies a case where display contents of a projection image to be projected on the screen are determined depending on the distance between the screen and the user having left the concentrated area. A fifth embodiment exemplifies a case where the user having left the concentrated area is moved to a predetermined specified area and a case where the user has left the specified area.

Configuration of an Information Processing Apparatus in the Fifth Embodiment

Figures 21, 22:
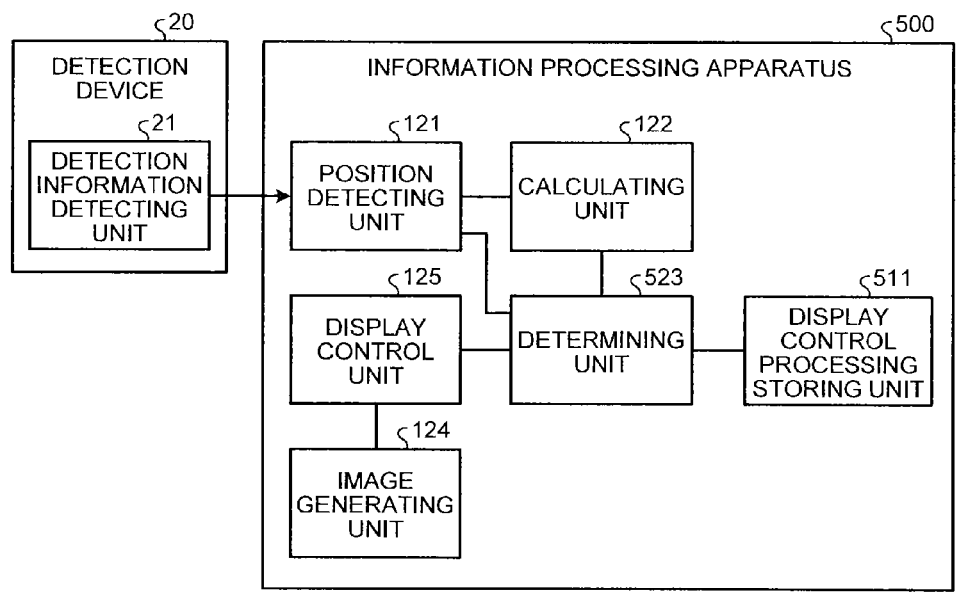
FIG. 21 is a functional block diagram illustrating a configuration example of an information processing apparatus according to a fifth embodiment of the present invention.
FIG. 22 is a diagram illustrating an example of information stored in a display control processing storing unit in the fifth embodiment.

The configuration of the information processing apparatus according to the fifth embodiment is described with reference to FIG. 21. FIG. 21 is a functional block diagram illustrating a configuration example of the information processing apparatus in the fifth embodiment. In FIG. 21, the components same as in the first embodiment are represented with the same numerals, and the detail description regarding the same components may be omitted. In the fifth embodiment, the functions, configurations, and processing of units are same as in the first embodiment, except a display control processing storing unit 511 and a determining unit 523, which are described in the following.

As illustrated in FIG. 21, an information processing apparatus 500 has the display control processing storing unit 511, the position detecting unit 121, the calculating unit 122, the determining unit 523, the image generating unit 124, and the display control unit 125. The detection device 20 includes the detection information detecting unit 21.

The determining unit 523 determines display control processing for a projection image depending on the presence or absence of a user in a specified area that is a predetermined area included in the detection target area. To be more specific, when the position of the user detected by the position detecting unit 121 is included in the specified area that is a predetermined area in the detection target area, the determining unit 523 determine display control processing for displaying a projection image on the screen. That is, the determining unit 523 determines that a presenter making a presentation, etc. with the information display system 1 has taken a stage, based on the fact that the user is positioned in the specified area, and determines display control processing for displaying the projection image when the presentation is started.

When the position of a user detected by the position detecting unit 121 is not included in the specified area, the determining unit 523 determines display control processing for blind-display of a projection image displayed on the screen. That is, the determining unit 523 determines that the presenter making a presentation, etc. with the information display system 1 has left the stage, based on the fact that the user is not positioned in the specified area, and determines display control processing for blind-display of the projection image when the presentation is finished or stopped temporarily. The display control processing for display or blind-display of a projection image is performed using information stored in the display control processing storing unit 511.

FIG. 22 is a diagram illustrating an example of information stored in the display control processing storing unit 511 according to the fifth embodiment. As illustrated in FIG. 22, the display control processing storing unit 511 stores therein the "presence/absence of a user in a specified area" representing the presence or absence of a user in a predetermined specified area and the "display control processing" representing display control processing for a projection image to be projected on the screen in an associated manner. For example, the display control processing storing unit 511 stores therein the presence/absence of a user in a specified area "present" and the display control processing "display" in an associated manner. In addition, the display control processing storing unit 511 stores therein the presence/absence of a user in a specified area "absent" and the display control processing "blind-display" in an associated manner. That is, the determining unit 523 refers to the display control processing storing unit 511, and determines display control processing for displaying a projection image when a user exists in the specified area, and determines display control processing for blind-display of a projection image when no user exists in the specified area.

Concept of Information Display Processing in the Fifth Embodiment

Figure 23:
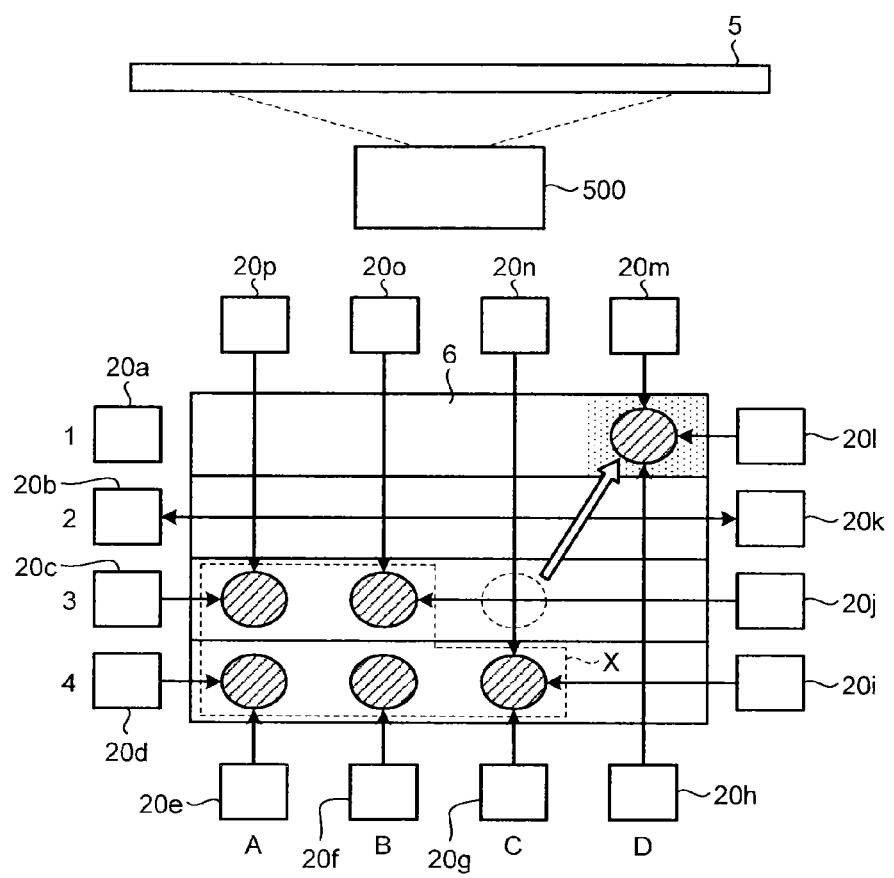
FIG. 23 is a conceptual diagram illustrating information display processing performed when a user exists in a specified area in the fifth embodiment.
Figure 24:
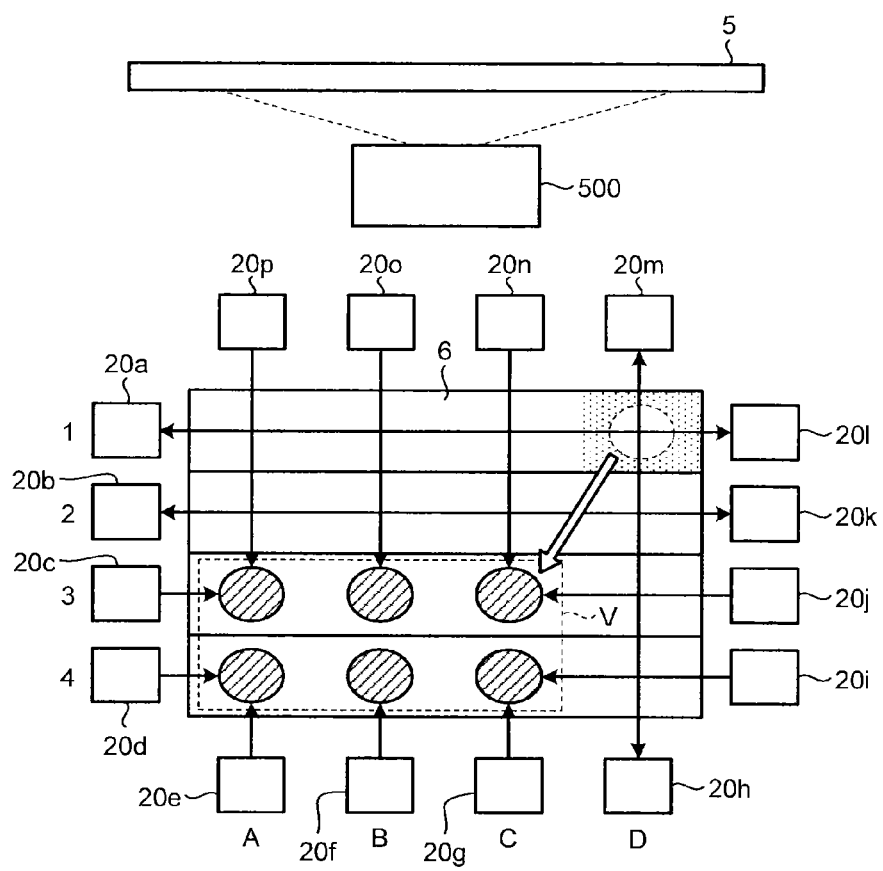
FIG. 24 is a conceptual diagram illustrating information display processing performed when no user exists in a specified area in the fifth embodiment.

Next, a concept of the information display processing according to the fifth embodiment is described with reference to FIGS. 23 and 24. FIG. 23 is a conceptual diagram illustrating the information display processing performed when a user exists in a specified area in the fifth embodiment. FIG. 24 is a conceptual diagram illustrating the information display processing performed when no user exists in a specified area in the fifth embodiment.

As illustrated in FIG. 23, the users are positioned on the seats 6 forming a detection target area, and view a projection image that is projected on the screen 5 with the information processing apparatus 500 (projector 10). The detection devices 20a to 20p are arranged near the seats 6. The arrangement example of the detection devices 20a to 20p in FIG. 23 is same as in the third embodiment.

The users are seated in a concentrated manner at "A4", "A3", "B4", "B3", "C4", and "C3" in FIG. 23. Thus, the information processing apparatus 300 regards such one part of the detection target area as a "concentrated area V". The concentrated area "concentrated area V" is positioned on the back side relative to the screen 5. Thus, the information processing apparatus 500 determines display control processing for enlarged display of the projection image with respect to the "concentrated area V". Here, the blind-display on the screen 5 is initially applied in the fifth embodiment.

Here, a case where a user at "C3" in the concentrated area "concentrated area V" has moved to "D1" included in the specified area is described. For example, when the position of a user is detected at "D1" included in the specified area, the information processing apparatus 500 acquires the display control processing "display" by referring to the display control processing storing unit 511, based on the fact that the user exists in the specified area, and determines display control processing for displaying the projection image. Here, the information processing apparatus 500 regards an area including "A4", "A3", "B11", "B3", and "C4" as a concentrated area "concentrated area X", and determines display control processing with respect to the concentrated area "concentrated area X". For example, the concentrated area "concentrated area X" is positioned on the back side relative to the screen 5. Thus, the information processing apparatus 500 determines display control processing for enlarged display of the projection image with respect to the "concentrated area X".

Here, a case where a user at "D1" included in the specified area has moved to "C3" near the concentrated area "concentrated area X" is described. For example, when the position of a user is not detected at "D1" included in the specified area, as illustrated in FIG. 24, the information processing apparatus 500 acquires display control processing "blind-display" by referring to the display control processing storing unit 511, based on the fact that no user exists in the specified area, and determines display control processing for blind-display of the projection image. Here, the information processing apparatus 500 regards an area including the user having moved to "C3" as the concentrated area "concentrated area V", and determines display control processing with respect to the concentrated area "concentrated area V". Here, the blind-display on the screen 5 is applied, and thus the users do not view the projection image actually. Once a user has moved to the specified area, the users can view the projection image. While the users can view the projection image, various kinds of control processing described above are reflected.

Flow of Information Display Processing in the Fifth Embodiment

Figure 25:
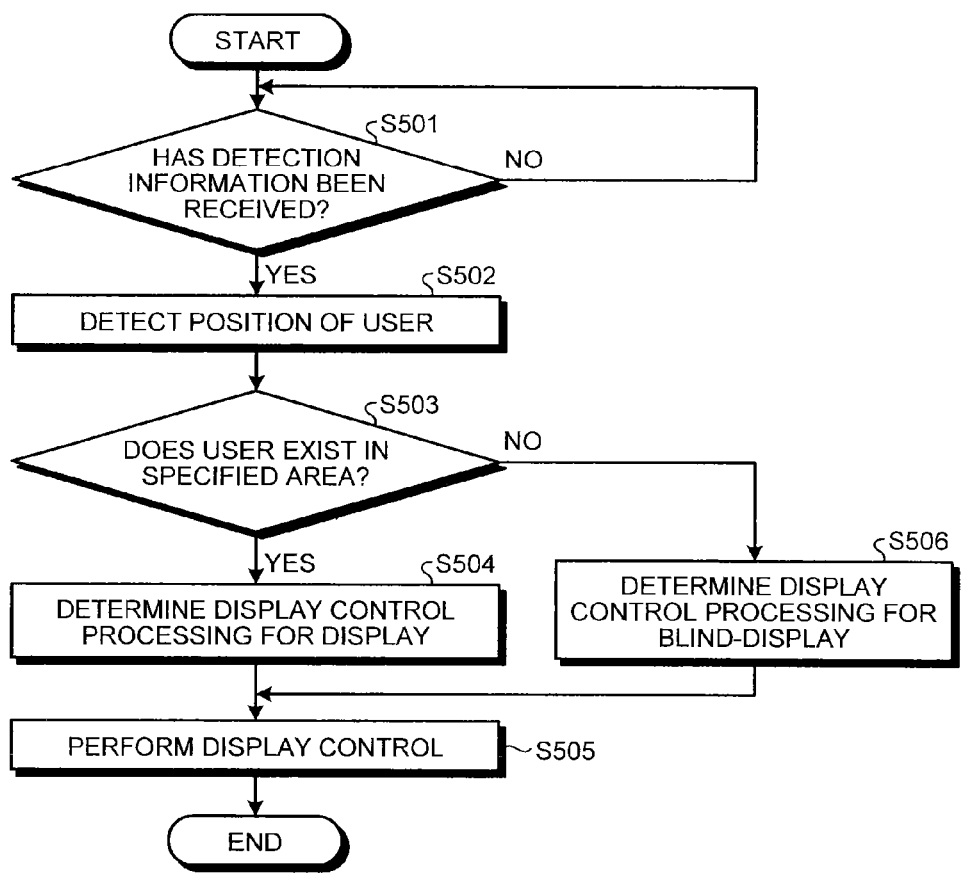
FIG. 25 is a flowchart illustrating an example of the flow of the information display processing in the fifth embodiment.

Next, the flow of the information display processing according to the fifth embodiment is described with reference to FIG. 25. FIG. 25 is a flowchart illustrating an example of the flow of the information display processing in the fifth embodiment. FIG. 25 exemplifies the flow of the information display processing in a state that display control is performed depending on the positions of the concentrated areas and the positions of the users relative to the screen.

As illustrated in FIG. 25, upon receiving the detection information transmitted by the detection device 20 (detection devices 20a to 20p) (Yes at Step S501), the position detecting unit 121 detects the positions of the users in the detection target area based on an image of the detection target area included in the detection information (Step S502). When the position detecting unit 121 has not received detection information (No at Step S501), it waits for reception of the detection information.

The determining unit 523 determines whether a user exists in the specified area based on the positions of the users detected by the position detecting unit 121 (Step S503). If the determining unit 523 determines that a user exists in the specified area (Yes at S503), it acquires the display control processing "display" corresponding to "present" representing that a user exists in the specified area by referring to the display control processing storing unit 511, and determines display control processing for displaying the projection image (Step S504). Then, the display control unit 125 performs display control for projecting the projection image generated by the image generating unit 124 with the projector 10 (Step S505).

If the determining unit 523 determines that no user exists in the specified area (No at Step S503), it acquires the display control processing "blind-display" corresponding to "absent" representing that no user exists in the specified area by referring to the display control processing storing unit 511, and determines display control processing for blind-display of the projection image (Step S506). Then, the display control unit 125 performs display control for blind-display of the projection image generated by the image generating unit 124 with the projector 10 (Step S505).

Effects of the Fifth Embodiment

As described above, the information processing apparatus 500 determines display control processing for display or blind-display of a projection image depending on the fact that the presenter has taken or left the platform in the presentation, etc. Thus, it is possible to perform display control appropriate in a presentation in which a plurality of users participate.

Sixth Embodiment

The information processing apparatuses 100 to 500 according to the invention have been described. However, the invention can be implemented in various different embodiments other than the above-described ones. Other embodiments are described regarding (1) display control in accordance with a gesture, (2) processing in accordance with the size of a concentrated area, and (3) configuration.

(1) Display Control in Accordance with a Gesture

The fourth embodiment exemplifies the display control for a projection image performed when a user in the concentrated area has left the concentrated area. However, it is possible to perform display control for the projection image depending on a gesture of the user having left the concentrated area. For example, when a user in the concentrated area has moved to a position nearer to the screen as illustrated in FIG. 18, and the user then makes a gesture that is a given action, the information processing apparatus determines display control processing for enlarged display of a projection image. Here, the gesture of the user is detected by the position detecting unit 121 based on an image obtained from the detection device 20. The gesture is detected by an arbitrary method such as recognition based on a difference image between given frames. When the position detecting unit 121 detects a gesture of the user, the calculating unit 422 calculates the distance between the position of the user and the screen. Moreover, the determining unit 423 determines display control processing for enlarged display when the distance calculated by the calculating unit 422 is equal to or smaller than the first distance, and determines display control processing for reduced display when the distance is equal to or larger than the second distance. As a result, it is possible to perform appropriate display control depending on the reason why the user has moved (the user has moved because it is difficult to view a projection image, or the user has simply moved).

(2) Processing in Accordance with the Size of a Concentrated Area

The third embodiment, etc. exemplify a case where the display control processing for a projection image is determined depending on the positions of the concentrated areas relative to the screen. Here, regarding which concentrated area is considered in determining display control processing, wider concentrated area may be prioritized. For example, FIG. 14 exemplifies the concentrated area "concentrated area S" and the concentrated area "concentrated area T", in which the concentrated area "concentrated area S" is larger. Thus, display control processing may be determined in accordance with only the concentrated area "concentrated area S". The size of a concentrated area can be recognized by the number of users in a concentrated area.

(3) Configuration

The processing procedures, control procedures, concrete names, various kinds of data, information including parameters, etc. that have been described or illustrated in the drawings can be changed arbitrarily unless specified otherwise. For example, the information stored in the display control processing storing units 111 to 511 is not limited to one in the above-described examples, and can be appropriately changed depending on cases where the information display system 1 is applied. Regarding the detection information obtained from the detector, device 20, other method can be used as long as information allows the detection of positions of users, etc.

The illustrated components of the information processing apparatuses 100 to 500 are based on the functional concept, and are not necessarily configured physically as illustrated in the drawings. That is, the concrete form of distribution and integration of each of the components is not limited to the forms illustrated in the drawings, and the entire of the components or one part thereof may be distributed or integrated functionally or physically in an arbitrary unit, depending on various loads, a use state, etc. For example, the image generating unit 124 and the display control unit 125 may be integrated as a "generated image display control unit" that generates a projection image to be projected on the screen and performs display control with correction, etc. for the projection image in accordance with determined display control processing.

According to one aspect, the present invention exerts an effect of enabling display control preferable for a plurality of users.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus, comprising:
circuitry to:
  detect positions of a plurality of users existing in a detection target area;
  calculate a plurality of feature quantities representing a relation between the positions of the users detected by the detecting and a projection plane on which a projection image is projected; and
  determine display control processing for the projection image depending on the feature quantities calculated by the calculating,
wherein:
  the calculating calculates, as the feature quantities, directions of the positions of the users detected by the detecting, relative to the projection plane, based on the positions of the users in the detection target area,
  the determining determines the display control processing for the projection image depending on the directions of the positions of the users relative to the projection plane that are calculated by the calculating,
  the calculating calculates, as the feature quantities, a position of concentrated area where the users detected by the detecting exist in a concentrated manner, relative to the projection plane, based on the positions of the users in the detection target area,
  the determining determines the display control processing for the projection image depending on the position of the concentrated area relative to the projection plane that are calculated by the calculating,
  the calculating calculates, when the concentrated area is reduced and a position of a user is detected outside the concentrated area but in the detection target area, a distance between the position of the user and the projection plane, as the feature quantity, and
  the determining determines the display control processing for enlarging the projection image when the distance calculated by the calculating is equal to or smaller than a given distance.

2. The information processing apparatus according to claim 1, further comprising a display controller that controls display of the projection image on the projection plane in accordance with the display control processing determined by the determining.

3. The information processing apparatus according to claim 1, wherein
  the calculating calculates distances between the positions of the users detected by the detecting and the projection plane, as the feature quantities, and
  the determining determines the display control processing for reducing the projection image when all of the distances calculated by the calculating unit are equal to or smaller than a given distance.

4. The information processing apparatus according to claim 1, wherein
  the calculating calculates distances between the positions of the users detected by the detecting and the projection plane, as the feature quantities, and
  the determining determines the display control processing for enlarging the projection image when all of the distances calculated by the calculating are equal to or larger than a given distance.

5. The information processing apparatus according to claim 1, wherein the determining determines, when the users exist at one end of the detection target area in the horizontal direction of the projection plane, the display control processing for performing keystone correction so that trapezoidal projection image is wider at either right or left side.

6. An information processing apparatus, comprising:
circuitry to:
  detect positions of a plurality of users existing in a detection target area;
  calculate a plurality of feature quantities representing a relation between the positions of the users detected by the detecting and a projection plane on which a projection image is projected; and
  determine display control processing for the projection image depending on the feature quantities calculated by the calculating,
wherein:
  the calculating calculates, as the feature quantities, directions of the positions of the users detected by the detecting, relative to the projection plane, based on the positions of the users in the detection target area,
  the determining determines the display control processing for the projection image depending on the directions of the positions of the users relative to the projection plane that are calculated by the calculating,
  the calculating calculates, when a concentrated area is reduced and a position of a user is detected outside the concentrated areas but in the detection target area, a distance between the position of the user and the projection plane, as the feature quantity,
  the determining determines the display control processing for reducing the projection image when the distance calculated by the calculating unit is equal to or larger than a given distance,
  the calculating calculates, as the feature quantities, a position of the concentrated area where the users detected by the position detecting exist in a concentrated manner, relative to the projection plane, based on the positions of the users in the detection target area, and
  the determining determines the display control processing for the projection image depending on the position of the concentrated area relative to the projection plane that are calculated by the calculating.

7. The information processing apparatus according to claim 1, wherein
  the detecting detects an action of the user, and
  the calculating calculates a distance between the user and the plane of projection when the action of the user detected by the position detecting is a predetermined given action.

8. The information processing apparatus according to claim 1, wherein the determining determines the display control processing for the projection image depending on presence or absence of the user in a predetermined specified area included in the detection target area.

9. An information display system, comprising:
circuitry configured to perform:
  detection information detecting that detects detection information including information for detecting positions of a plurality of users existing in a detection target area;
  position detecting that detects positions of the users from the detection information;
  calculating that calculates a plurality of feature quantities representing a relation between the detected positions of the users and a projection plane on which a projection image is projected;
  determining that determines display control processing for the projection image depending on the calculated feature quantities; and display controlling that controls display of the projection image on the projection plane in accordance with the determined display control processing, wherein:

the calculating calculates, as the feature quantities, directions of the positions of the users detected by the detecting, relative to the projection plane, based on the positions of the users in the detection target area, the determining determines the display control processing for the projection image depending on the directions of the positions of the users relative to the projection plane that are calculated by the calculating, the calculating calculates, as the feature quantities, a position of concentrated area where the users detected by the detecting exist in a concentrated manner, relative to the projection plane, based on the positions of the users in the detection target area, the determining determines the display control processing for the projection image depending on the position of the concentrated area relative to the projection plane that are calculated by the calculating, the calculating calculates, when the concentrated area is reduced and a position of a user is detected outside the concentrated area but in the detection target area, a distance between the position of the user and the projection plane, as the feature quantity, and the determining determines the display control processing for enlarging the projection image when the distance calculated by the calculating is equal to or smaller than a given distance.

10. An information display method, comprising:

detecting detection information including information for detecting positions of a plurality of users existing in a detection target area;

detecting positions of the users from the detection information;

calculating a plurality of feature quantities representing a relation between the detected positions of the users and a projection plane on which a projection image is projected;

determining display control processing for the projection image depending on the calculated feature quantities; and controlling display of the projection image on the projection plane in accordance with the determined display control processing, wherein:

the calculating calculates, as the feature quantities, directions of the positions of the users detected by the detecting, relative to the projection plane, based on the positions of the users in the detection target area, the determining determines the display control processing for the projection image depending on the directions of the positions of the users relative to the projection plane that are calculated by the calculating, the calculating calculates, as the feature quantities, a position of concentrated area where the users detected by the detecting exist in a concentrated manner, relative to the projection plane, based on the positions of the users in the detection target area, the determining determines the display control processing for the projection image depending on the position of the concentrated area relative to the projection plane that are calculated by the calculating, the calculating calculates, when the concentrated area is reduced and a position of a user is detected outside the concentrated area but in the detection target area, a distance between the position of the user and the projection plane, as the feature quantity, and the determining determines the display control processing for enlarging the projection image when the distance calculated by the calculating is equal to or smaller than a given distance.

11. The information processing apparatus according to claim 6, further comprising a display controller that controls display of the projection image on the projection plane in accordance with the display control processing determined by the determining.

12. The information processing apparatus according to claim 6, wherein the calculating calculates distances between the positions of the users detected by the detecting and the projection plane, as the feature quantities, and the determining determines the display control processing for reducing the projection image when all of the distances calculated by the calculating unit are equal to or smaller than a given distance.

13. The information processing apparatus according to claim 6, wherein the calculating calculates distances between the positions of the users detected by the detecting and the projection plane, as the feature quantities, and the determining determines the display control processing for enlarging the projection image when all of the distances calculated by the calculating are equal to or larger than a given distance.

14. The information processing apparatus according to claim 6, wherein the determining determines, when the users exist at one end of the detection target area in the horizontal direction of the projection plane, the display control processing for performing keystone correction so that trapezoidal projection image is wider at either right or left side.

15. The information processing apparatus according to claim 6, wherein the determining determines the display control processing for the projection image depending on presence or absence of the user in a predetermined specified area included in the detection target area.

16. The information display system according to claim 9, wherein the calculating calculates distances between the positions of the users detected by the detecting and the projection plane, as the feature quantities, and the determining determines the display control processing for reducing the projection image when all of the distances calculated by the calculating unit are equal to or smaller than a given distance.

17. The information display system according to claim 9, wherein the calculating calculates distances between the positions of the users detected by the detecting and the projection plane, as the feature quantities, and the determining determines the display control processing for enlarging the projection image when all of the distances calculated by the calculating are equal to or larger than a given distance.

18. The information display system according to claim 9, wherein the determining determines, when the users exist at one end of the detection target area in the horizontal direction of the projection plane, the display control processing for performing keystone correction so that trapezoidal projection image is wider at either right or left side.

19. The information display system according to claim 9, wherein
   the detecting detects an action of the user, and
   the calculating calculates a distance between the user and the plane of projection when the action of the user detected by the position detecting is a predetermined given action.

20. The information display system according to claim 9, wherein the determining determines the display control processing for the projection image depending on presence or absence of the user in a predetermined specified area included in the detection target area.

* * * * *